(12) United States Patent
Choi

(10) Patent No.: US 8,463,959 B2
(45) Date of Patent: Jun. 11, 2013

(54) HIGH-SPEED INTERFACE FOR DAISY-CHAINED DEVICES

(75) Inventor: Byoung Jin Choi, Kanata (CA)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 119 days.

(21) Appl. No.: 13/012,754

(22) Filed: Jan. 24, 2011

(65) Prior Publication Data

US 2011/0296056 A1 Dec. 1, 2011

Related U.S. Application Data

(60) Provisional application No. 61/349,943, filed on May 31, 2010.

(51) Int. Cl.
  *G06F 3/00* (2006.01)
  *G06F 5/00* (2006.01)
  *G06F 13/00* (2006.01)
  *G06F 13/28* (2006.01)

(52) U.S. Cl.
  USPC .............. 710/58; 710/6; 710/52; 710/307; 711/100

(58) Field of Classification Search
  USPC .................................................. 710/6
  See application file for complete search history.

(56) References Cited

U.S. PATENT DOCUMENTS

| | | | |
|---|---|---|---|
| 6,799,235 B2 | 9/2004 | Bormann et al. | |
| 7,254,663 B2 | 8/2007 | Bartley et al. | |
| 7,342,816 B2 | 3/2008 | Bartley et al. | |
| 7,345,900 B2 | 3/2008 | Bartley et al. | |
| 7,380,152 B2 | 5/2008 | Chung | |
| 7,545,664 B2 | 6/2009 | Bartley et al. | |
| 7,650,459 B2 | 1/2010 | Eilert et al. | |
| 7,673,093 B2 | 3/2010 | Bartley et al. | |
| 7,688,652 B2 | 3/2010 | Oh | |
| 2006/0095592 A1 | 5/2006 | Borkenhagen | |
| 2008/0040529 A1* | 2/2008 | Bartley et al. | 710/307 |
| 2008/0198682 A1* | 8/2008 | Pyeon | 365/230.06 |
| 2008/0205168 A1* | 8/2008 | Pyeon et al. | 365/189.14 |
| 2010/0082861 A1* | 4/2010 | Barbara et al. | 710/106 |

FOREIGN PATENT DOCUMENTS

WO 2007036050 5/2007

* cited by examiner

*Primary Examiner* — Chun-Kuan Lee
*Assistant Examiner* — Brooke Taylor
(74) *Attorney, Agent, or Firm* — Harvey Auerback

(57) ABSTRACT

A plurality of devices are operated by storing at a device a first ID number received at a first port of the device and a second ID number received at a second port of the device. The device receives a data command through at least one of the first and second ports. The data command has a command ID number. The device executes the data command when at least one of the command ID number is equal to the first ID number when the data command is received at the first port and the command ID number is equal to the second ID number when the data command is received at the second port.

4 Claims, 30 Drawing Sheets

HIGH-SPEED INTERFACE FOR DAISY-CHAINED DEVICES

CROSS-REFERENCE TO RELATED APPLICATIONS

This application is a utility application claiming priority to co-pending U.S. Provisional Application Ser. No. 61/349,943 filed on May 31, 2010 entitled "HIGH SPEED INTERFACE FOR MEMORY DEVICES," the entirety of which is incorporated by reference herein.

FIELD OF THE INVENTION

The invention relates generally to a memory interface. More specifically, the invention relates to a high-speed interface that provides bidirectional communications in a loop-chained memory.

BACKGROUND

Memory devices are used to store data. The demand for large memory systems with high bandwidth has increased during recent years. For large memory systems, several devices may share a common bus. For example, the data bus or the clock signal may share a single bus, or a set of conductive elements. This bus sharing causes an increase in the capacitive loading of each device. The increased loading degrades signal quality as well as the switching speed of signals, which then requires slower clocking and consequently reduced bandwidth.

A daisy-chained interconnection 100, is shown in FIG. 1, and a loop chained interconnection 200 is shown in FIG. 2, wherein memory devices are connected in series to reduce capacitive loading on the bus. However each memory device does not use the full channel but rather just half of the channel to write or read data because data flows only in one direction when the write command or the read command issues.

BRIEF SUMMARY

In one aspect, the invention features a method for operating a plurality of devices comprising storing at a device a first ID number received at a first port of the device and a second ID number received at a second port of the device. The device receives a data command through at least one of the first and second ports. The data command has a command ID number. The device executes the data command when at least one of the command ID number is equal to the first ID number when the data command is received at the first port and the command ID number is equal to the second ID number when the data command is received at the second port.

In another aspect, the invention features a high-speed interface device comprising a command state machine in communication with a first port, a second port and a device resource. The command state machine controls data flow therebetween in response to at least one of a first data command received at the first port and a second data command received at the second port. The first port further comprises a first data buffer in communication with a data register and a page buffer, a first data strobe buffer in communication with a data strobe register and a first command strobe buffer in communication with a command strobe register. The data buffer and the command state machine receive a command in response to the first command strobe buffer. The second port further comprises a second data buffer in communication with the data register and the page buffer, a second data strobe buffer in communication with the data strobe register and a second command strobe buffer in communication with the command strobe register. The data buffer and the command state machine receive a command in response to the second command strobe buffer. The device resource is in communication with the page buffer. The page buffer receives a data in response to at least one of the first data strobe buffer and the second data strobe buffer.

In another aspect, the invention features a daisy-chained system comprising a plurality of a device connected in a daisy-chain to a controller including a first controller port and a second controller port. Each controller port is capable of communicating a data and a command to each of the device. Each device comprises a command state machine in communication with a first port, a second port and a device resource. The command state machine controls data flow therebetween in response to at least one of a first data command received at the first port and a second data command received at the second port. The first port further comprises a first data buffer in communication with a data register and a page buffer, a first data strobe buffer in communication with a data strobe register and a first command strobe buffer in communication with a command strobe register. The data buffer and the command state machine receive a command in response to the first command strobe buffer. The second port further comprises a second data buffer in communication with the data register and the page buffer, a second data strobe buffer in communication with the data strobe register and a second command strobe buffer in communication with the command strobe register. The data buffer and the command state machine receive a command in response to the second command strobe buffer. The device resource is in communication with the page buffer. The page buffer receives a data in response to at least one of the first data strobe buffer and the second data strobe buffer.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Embodiments of the present invention provide bidirectional loop-chained connections between a memory controller and a plurality of devices to optimize communication bandwidth for operations including writing and reading. Reducing capacitive loading on signals shared by the devices improves signal slew rate and thus affords a faster system clock rate and bandwidth. Communication bandwidth is improved in a loop-chained arrangement by transmitting information over multiple preexisting communication paths. A loop-chain is a daisy-chain that begins and ends at the same functional block, for example the memory controller 310 shown in FIG. 3.

In one example, the communication over multiple paths is concurrent. In another example, the communication over one path temporally overlaps with the communication over another path. The loop-chained connections shown in the various figures and application show two communication ports to and from each device. It is envisioned that each device could have any number of ports. For example, a two-dimensional array would have four ports allowing overlapping communication with the device over all four ports. In another example, a three-dimensional array would have six ports to each device allowing overlapping communication with the device over all six ports.

A device shown in the various figures and application shows a memory device. It is envisioned that each device could be a transducer device, used for image sensing, radar beam forming, or an acoustic system for example. The device could also be a transceiver device used in a mesh communication network.

Figure 1:
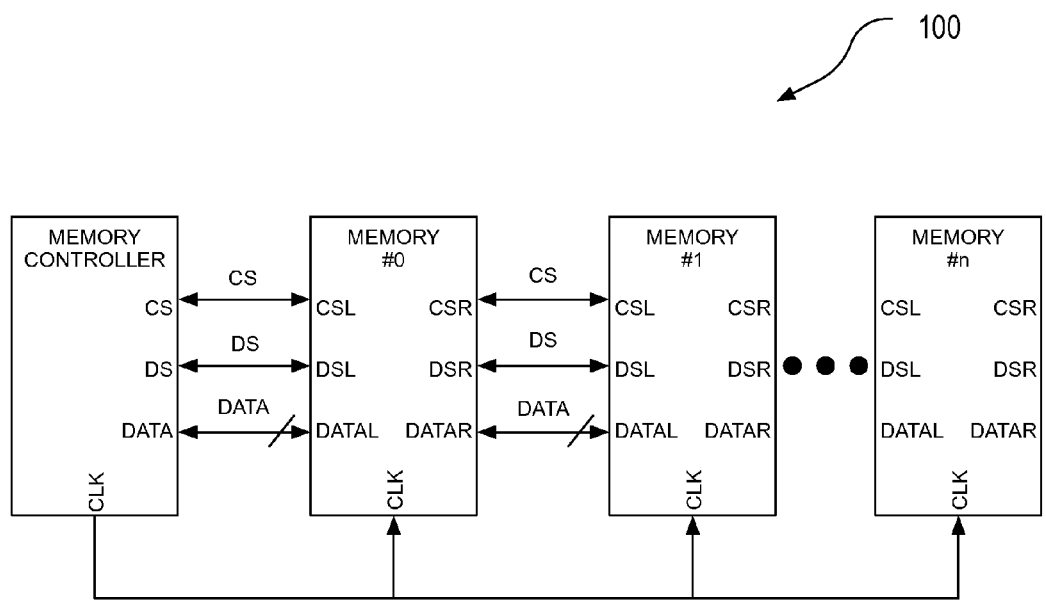
FIG. 1 is a conventional memory system with daisy-chained interconnections.
Figure 2:
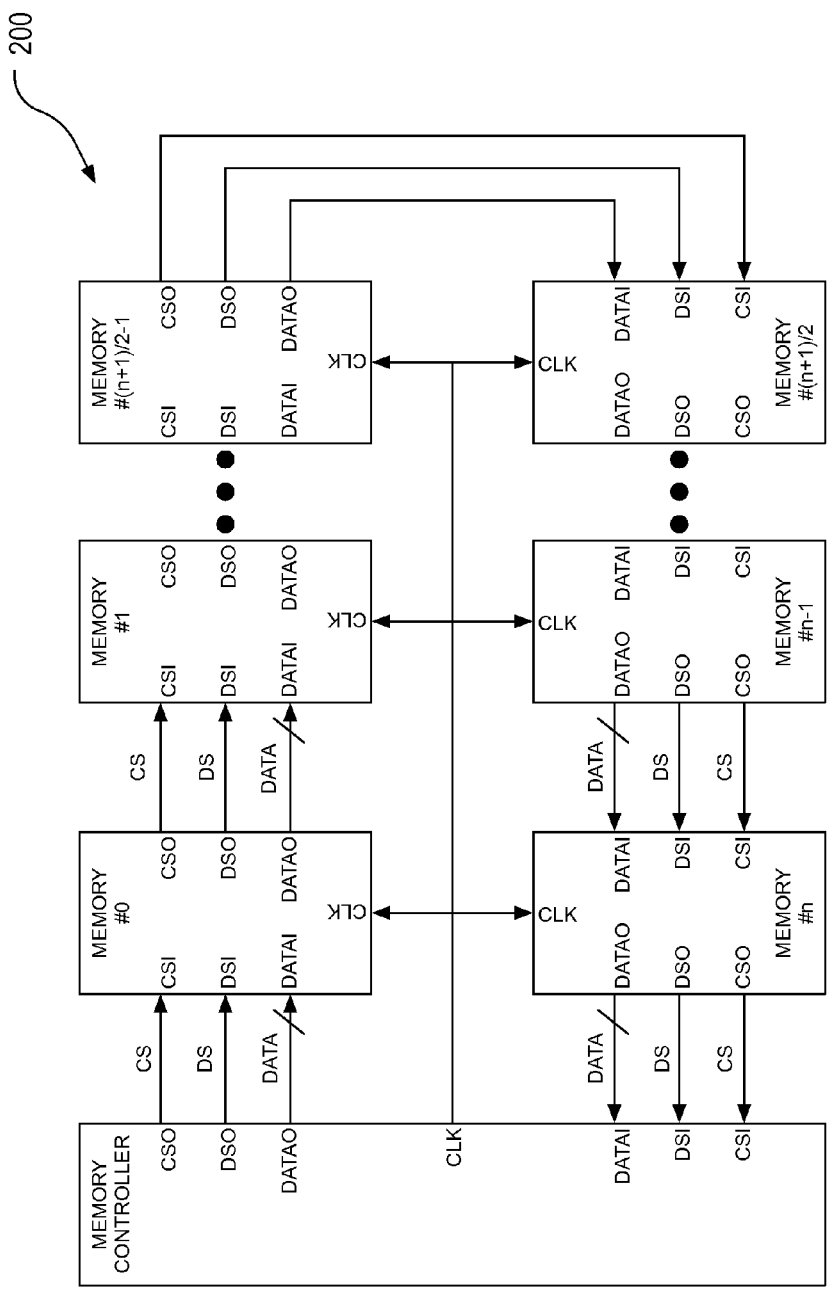
FIG. 2 is a conventional memory system with loop-chained interconnections.
Figure 3:
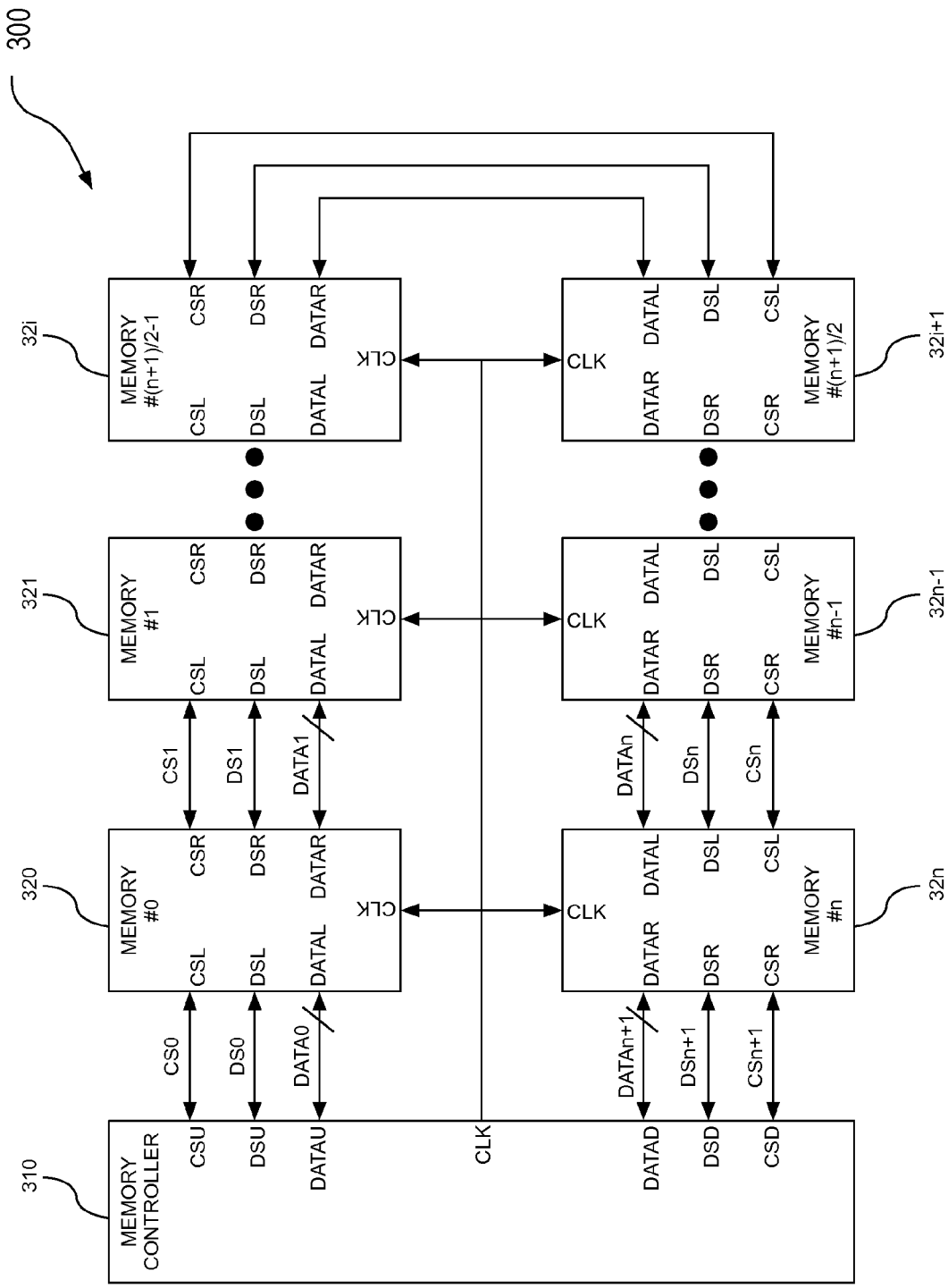
FIG. 3 is a memory system with bidirectional loop chained interconnections, according to an embodiment of the invention.

FIG. 3 shows a memory system 300 according to an embodiment of the invention. A memory controller 310 provides overall control of a plurality of memory devices 320, 321, 32i, 32i+1, 32n-1 and 32n. Control signals and data signals are communicated in a bidirectional manner between the controller and the memory devices. For example, in FIG. 3 a command strobe CS0, a data strobe DS0 and a data signal DATA0 communicate between the controller 310 and one port of a memory device 320. A command strobe CS1, a data strobe DS1 and a data signal DATA1 communicate between the memory device 320 and the next memory device 321 in the daisy-chain. The width of the data signal is any feasible width, such as but not limited to 4, 8 or 16. The memory controller 310 provides a clock signal CLK to each device.

Figure 4:
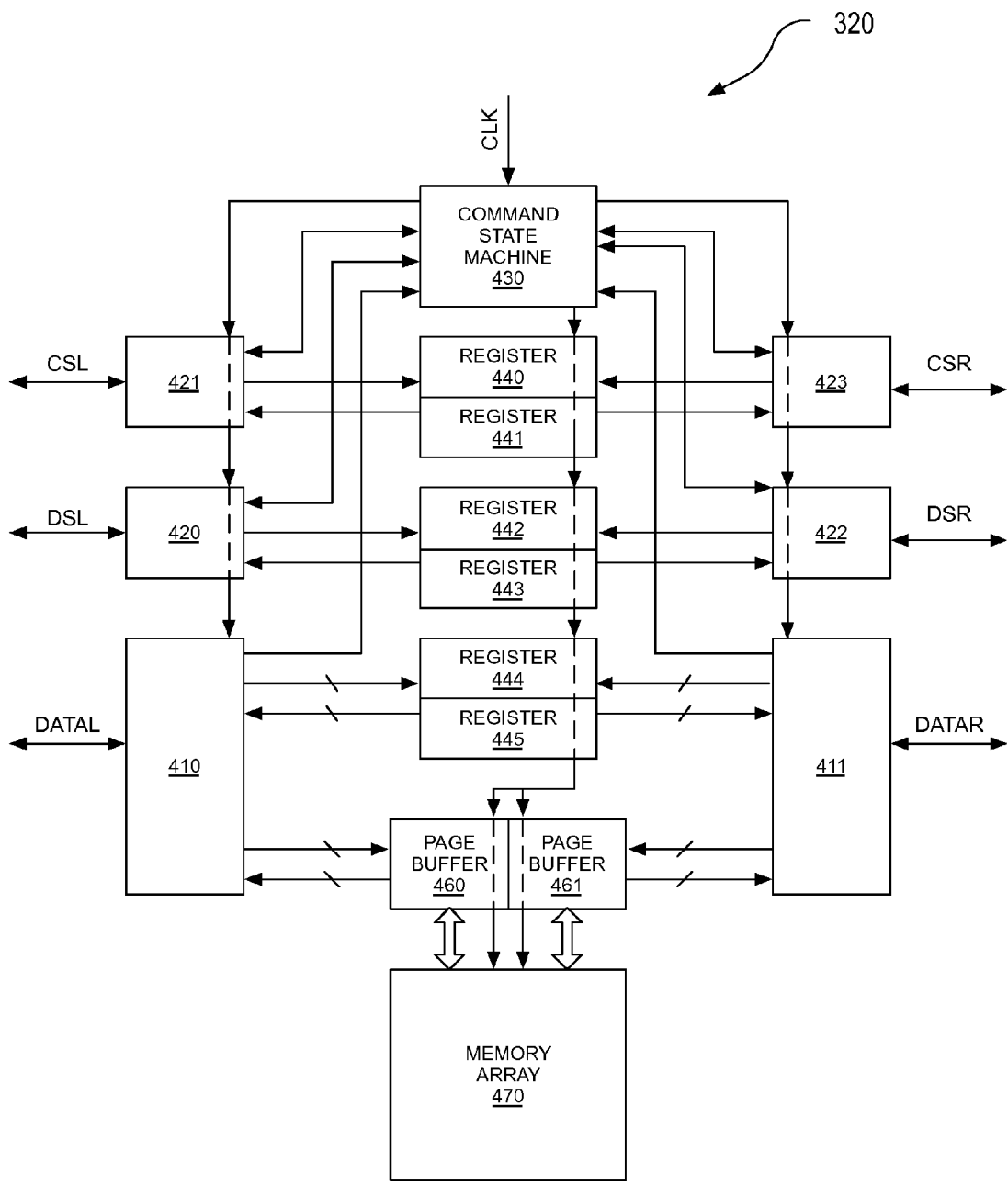
FIG. 4 is a block diagram of a memory device shown in FIG. 3, according to an embodiment of the invention.

FIG. 4 shows a block diagram of one of the memory devices 320 shown in FIG. 3. Each memory device includes bi-directional buffers DATAL 410, DATAR 411, DSL 420, CSL 421, DSR 422 and CSR 423 for receiving and providing corresponding signals. A state machine 430 receives the CLK signal and provides control signals to the bi-directional buffers 410, 411, 420, 421, 422, 423 and internal registers 440, 441, 442, 443, 444 and 445. A page buffer 460 and 461 provides temporary data storage for data write and read operations to a memory array 470. In another embodiment, where the memory device 320 is substituted for another device, such as a transducer or transceiver, the memory array 470 is a device resource. For example, when the device is a transducer device, the device resource is a transducer converting between electric signals (such as voltage) and pressure. When the device is a transceiver device, the device resource is a transceiver converting between radio frequency emissions and electric signals (such as voltage).

The memory device 320 can receive a WRITE command with a device ID number from both ports at CSL 421, DSL 420, and DATAL 410 and at CSR 423, DSR 422, and DATAR 411. If the received device ID number is the same as the device ID number registered in the memory device 320, the memory device 320 writes the input data into a page buffer 460 and 461. If the received device ID number is different from the device ID number registered in the memory device 320, the memory device 320 passes the data from DATAL 410 to DATAR 411 or from DATAR 411 to DATAL 410.

The memory device 320 can also receive a READ command with device ID number from both ports at CSL 421, DSL 420 and DATAL 410 and at CSR 423, DSR 422, and DATAR 411. If the received device ID number is same as the device ID number registered in the memory device 320, the memory device 320 reads out from the page buffer 460 and 461 to DATAL 410 and DATAR 411. If the received device ID number is different from the device ID number registered in the memory device 320, the memory device 320 passes the data from DATAL 410 to DATAR 411 or from DATAR 411 to DATAL 410.

Figure 5A:
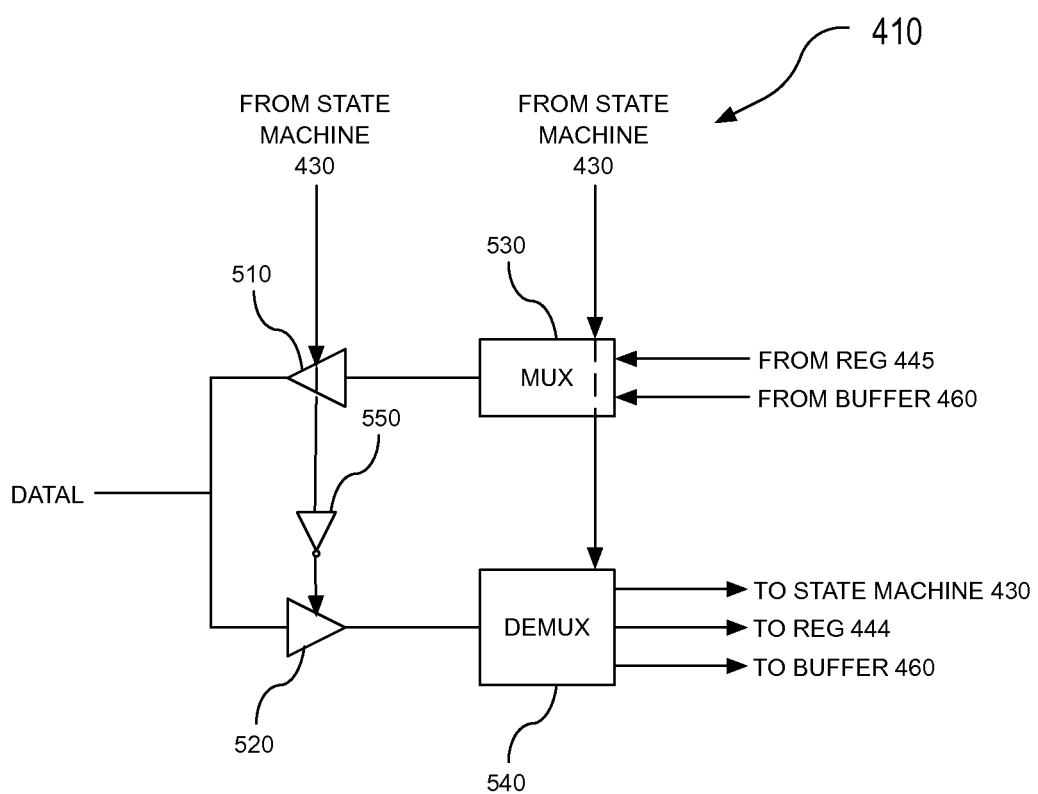
FIG. 5A is a block diagram of a data input/output block shown in FIG. 4, according to an embodiment of the invention.

FIG. 5A is a block diagram of the DATAL input/output block 410 shown in FIG. 4. Tri-state buffers 510 and 520 are controlled by the state machine 430 and an inverter 550. A multiplexer 530 selects data from the register 445 or the buffer 460 for output to DATAL 410. A de-multiplexer 540 provides input data from DATAL 410 to the state machine 430, register 444 or the buffer 460. A person of skill in the art will understand that the DATAR block 411 has a similar structure and works in a similar manner to the DATAL block 410.

Figure 5B:
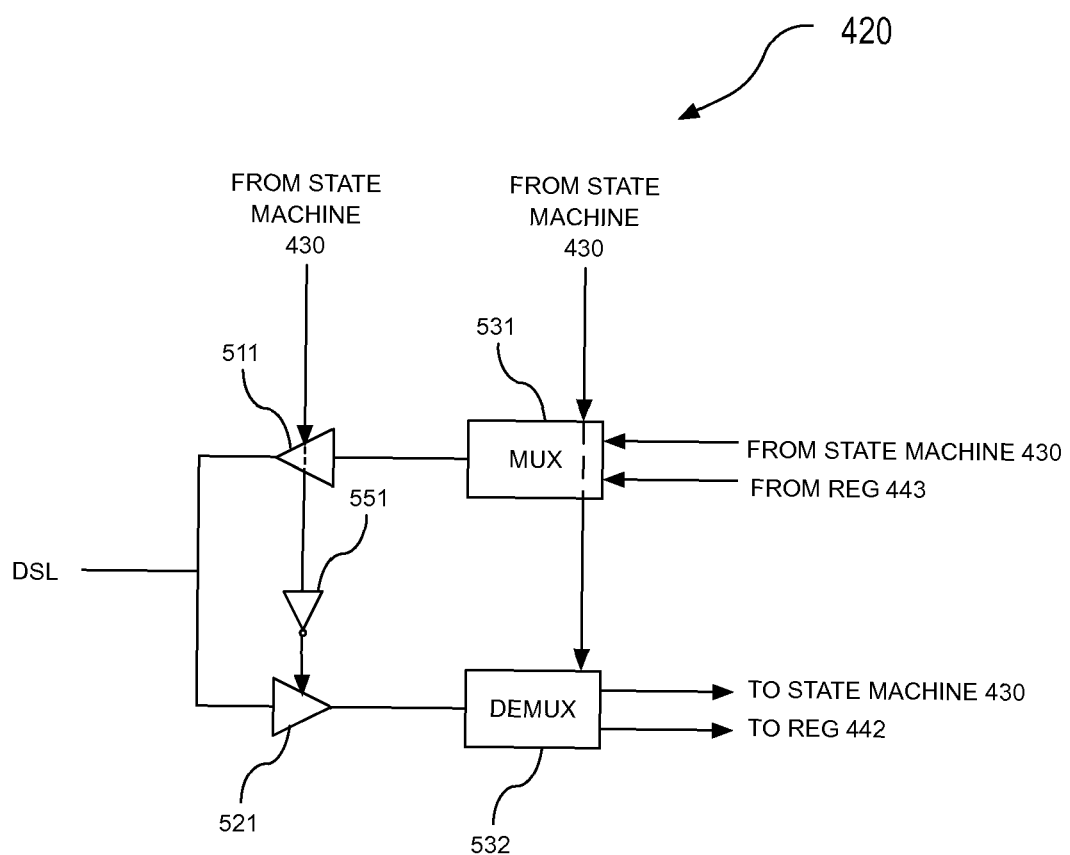
FIG. 5B is a block diagram of a control signal input/output block shown in FIG. 4, according to an embodiment of the invention.

FIG. 5B is a block diagram of the DSL input/output block 420 shown in FIG. 4. Tri-state buffers 511 and 521 are controlled by the state machine 430 and an inverter 551. A multiplexer 531 selects output from the state machine 430 or the register 443. A de-multiplexer provides data from DSL to the state machine 430 or register 442. A person of skill in the art will understand that the CSL 421, DSR 422 and CSR 423 blocks have a similar structure and work in a similar manner to the DSL block 420.

Figure 6A:
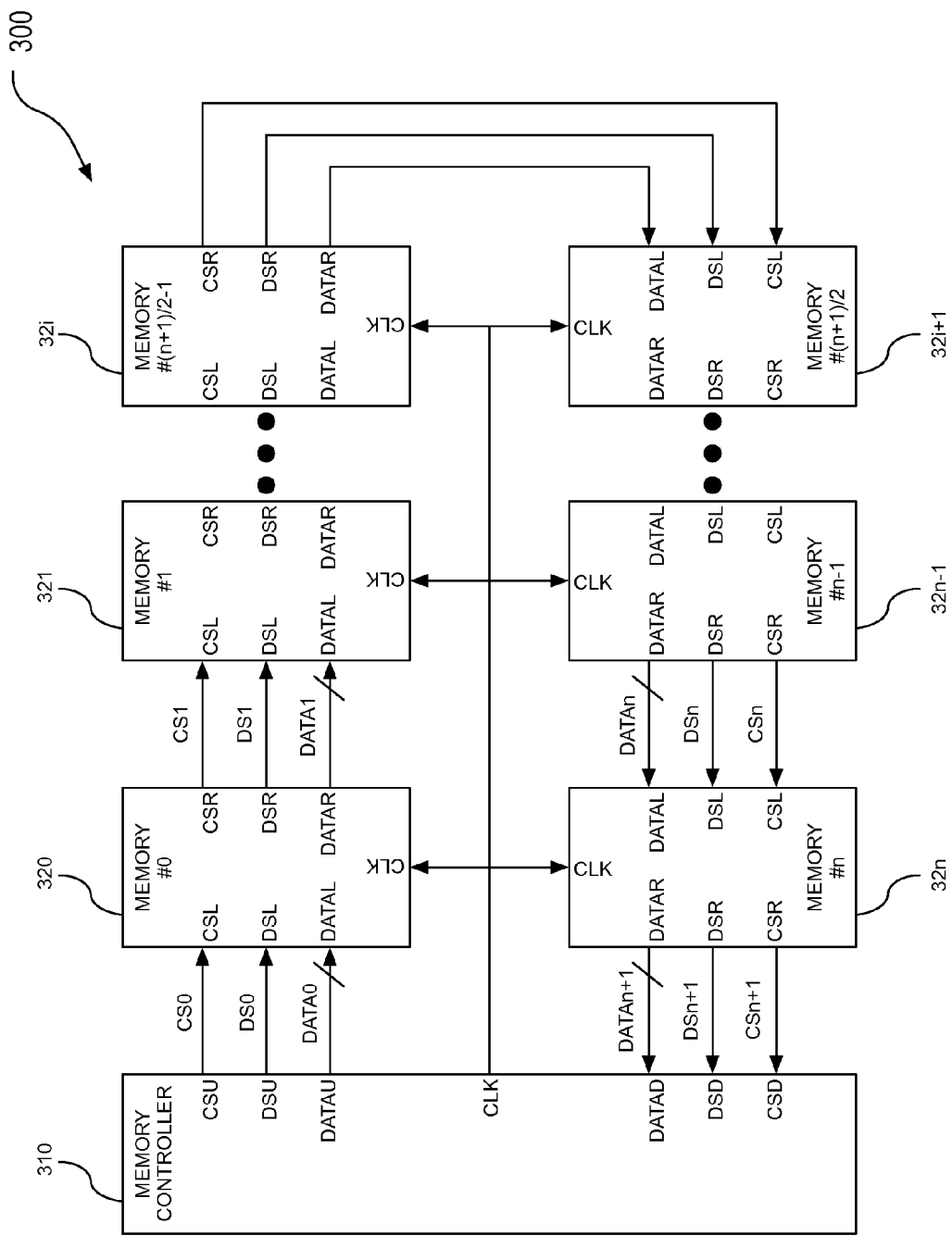
FIGS. 6A and 6B are schematic diagrams showing the directions of signals when the SETID command issues, according to an embodiment of the invention.
Figure 6B:
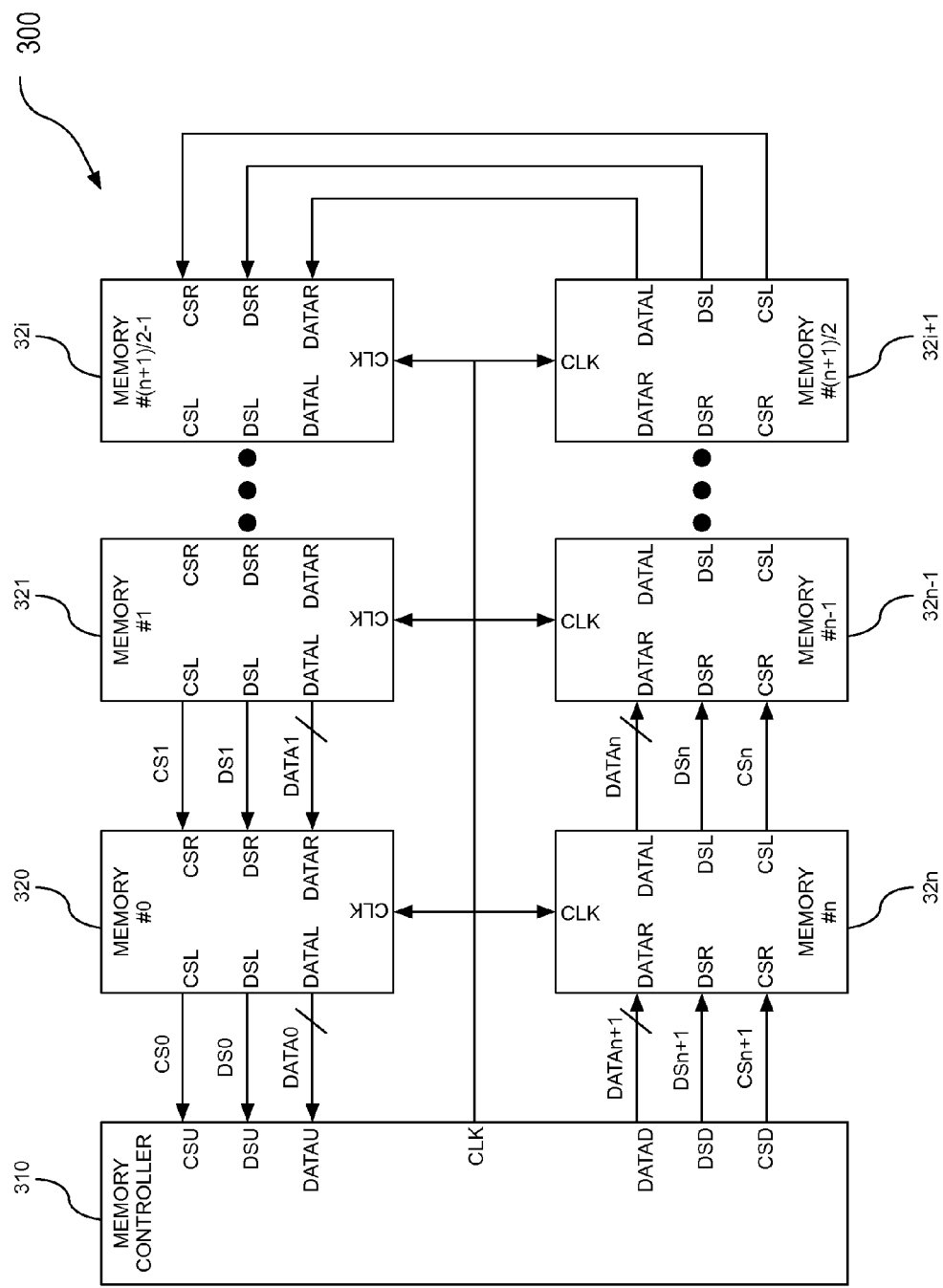

FIGS. 6A and 6B show the directions of the command strobe, data strobe and data signals when the SETID command issues. Note the signal directions are all clockwise, FIG. 6A, or all counter-clockwise, FIG. 6B, between the controller 310 and each of the memory devices 320, 321, 32$i$, 32$i$+1, 31$n$−1 and 32$n$.

Figure 6C:
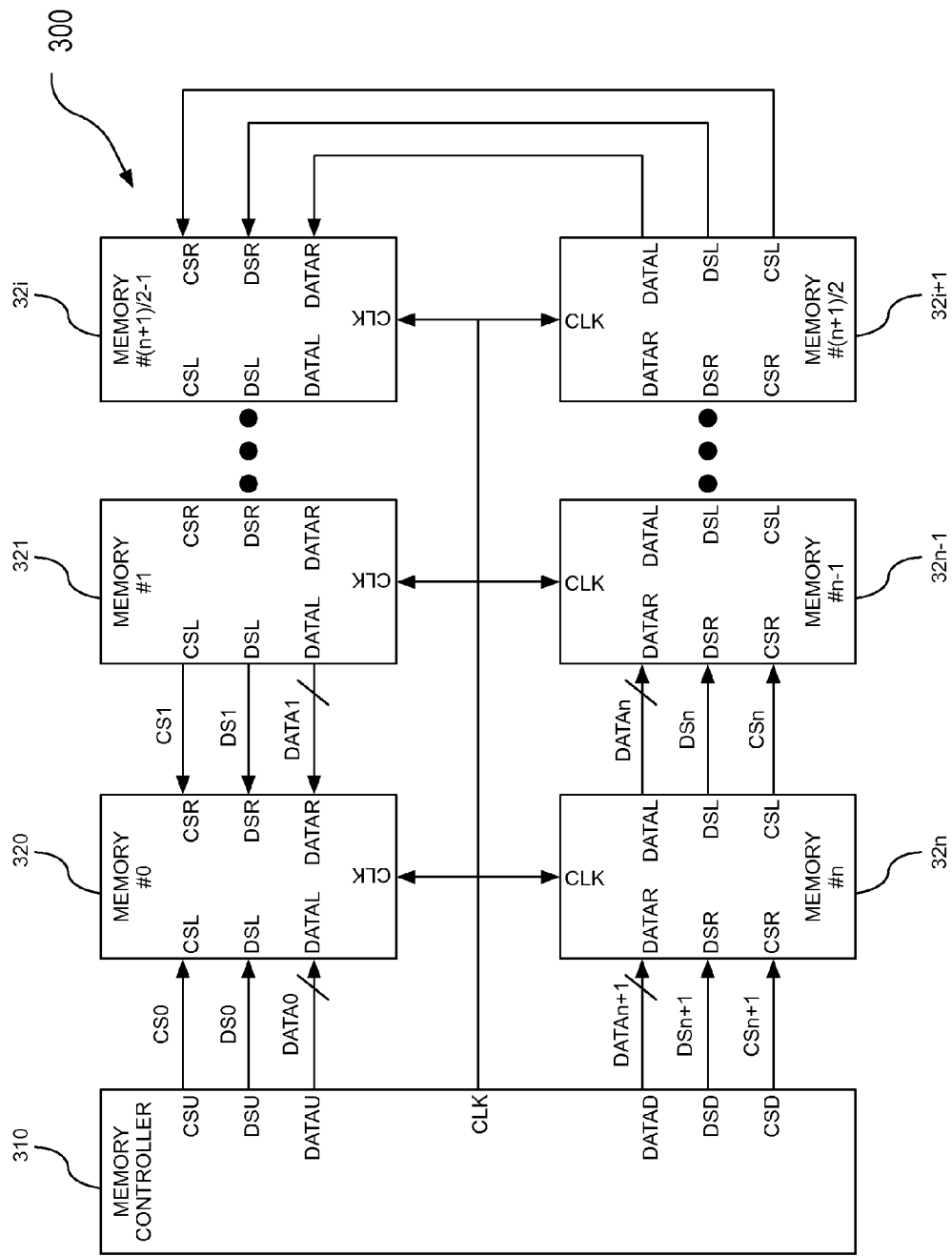
FIGS. 6C and 6D are schematic diagrams showing the directions of signals when the WRITE command issues, according to an embodiment of the invention.
Figure 6D:
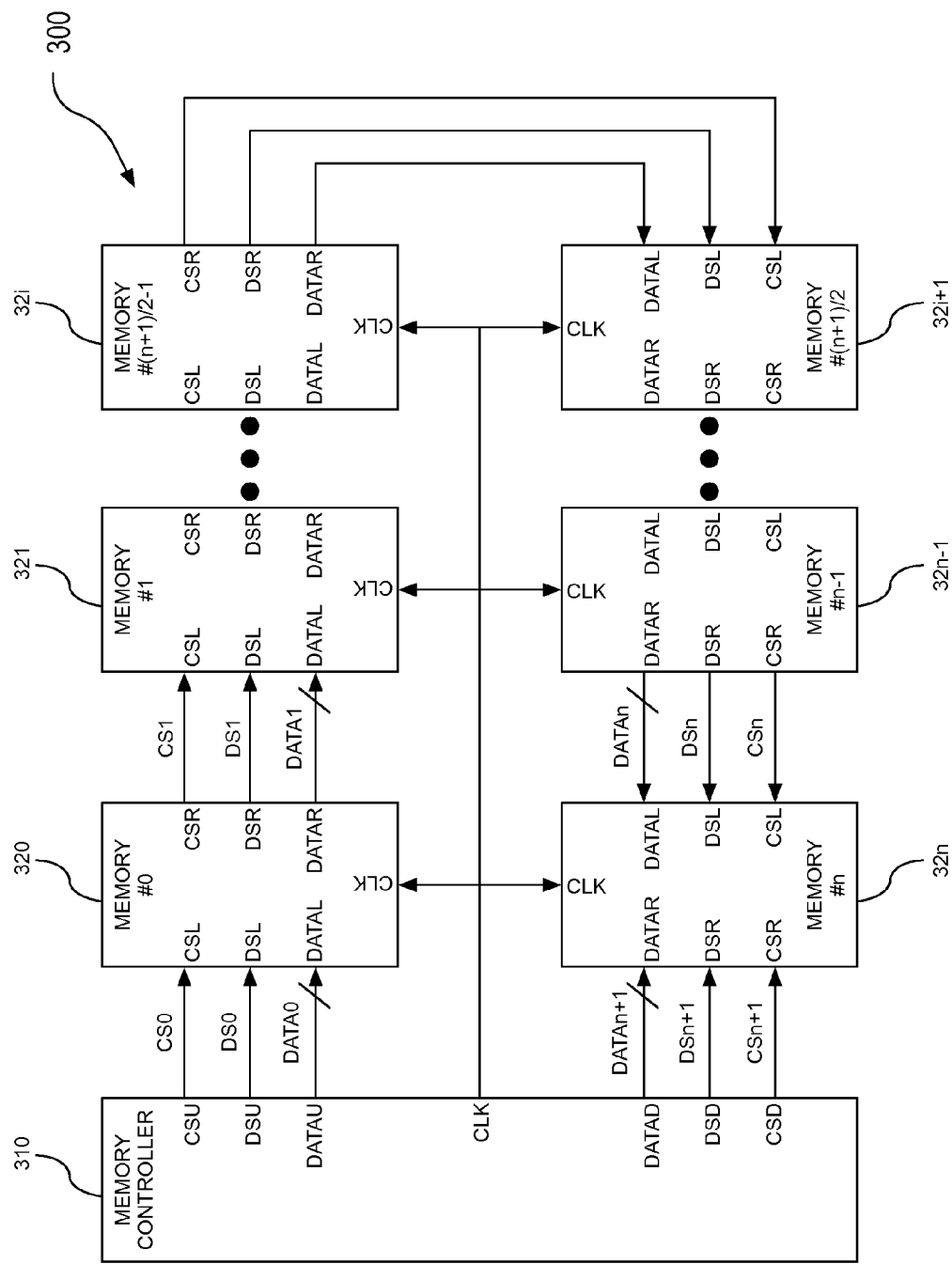

FIGS. 6C and 6D show the directions of signals when a WRITE command issues. Note that the signal directions are from the controller 310 towards the first memory device 320 in FIG. 6C, and from the controller 310 towards the last memory device 32$n$ in FIG. 6D.

Figure 6E:
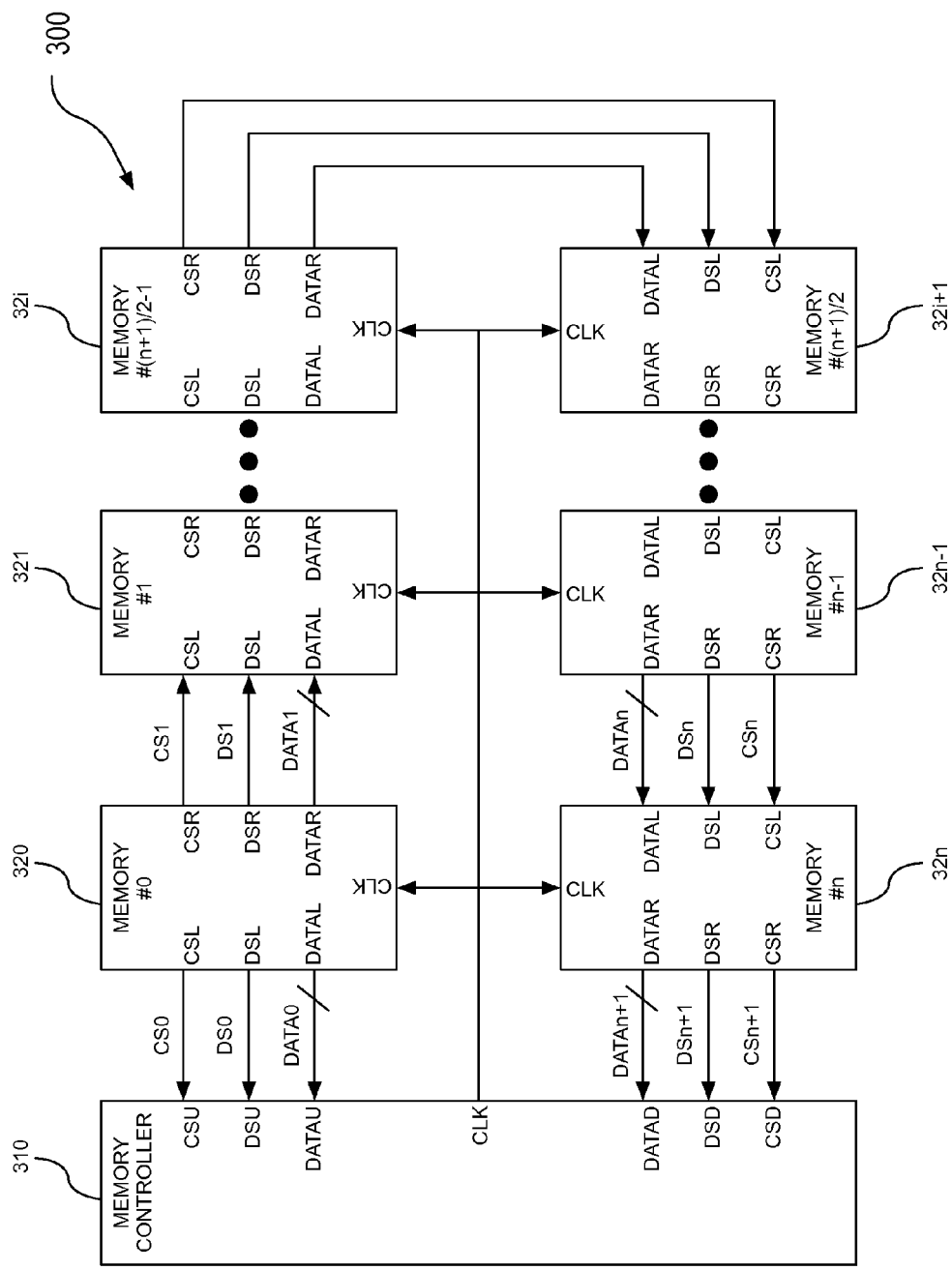
FIGS. 6E and 6F are schematic diagrams showing the directions of signals when the READ command issues, according to an embodiment of the invention.
Figure 6F:
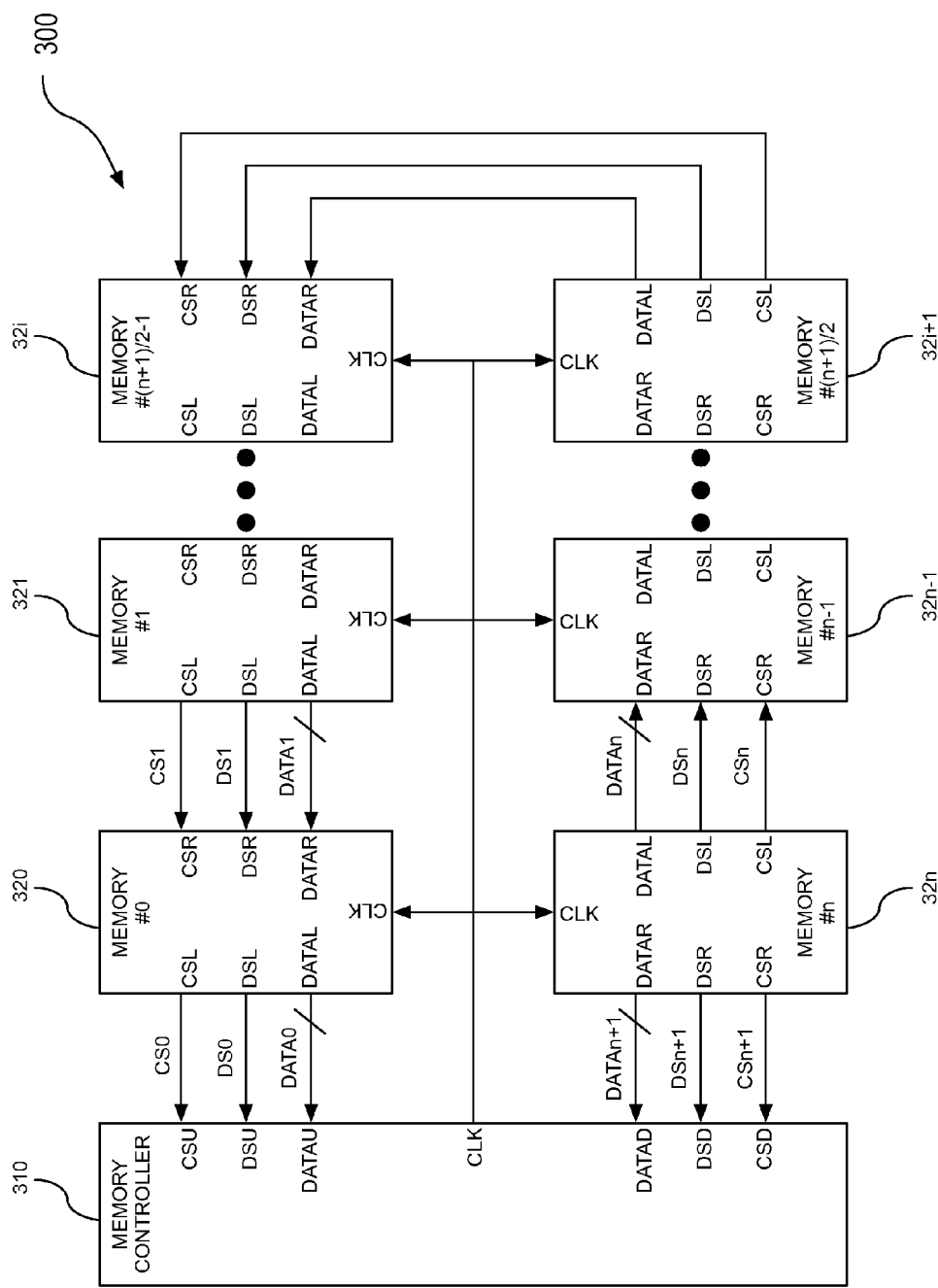

FIGS. 6E and 6F show the directions of signals when a READ command issues. Note that the signal directions are from the first memory device 320 towards the controller 310 in FIG. 6E, and from the last memory device 32$n$ towards the controller 310 in FIG. 6F.

Figure 7A:
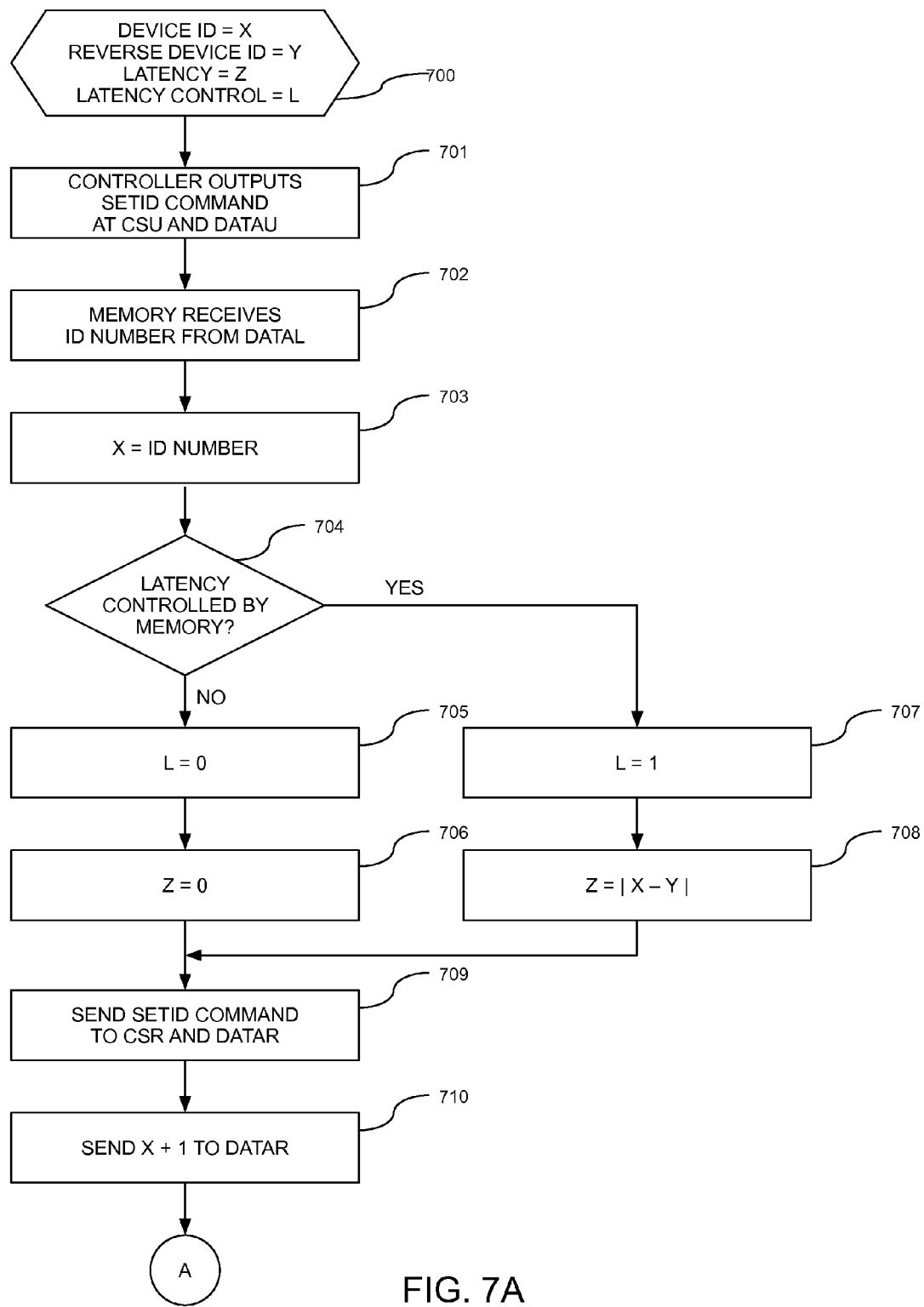
FIGS. 7A to 7G are flowcharts of the methods performed by a memory device, according to an embodiment of the invention.
Figure 7B:
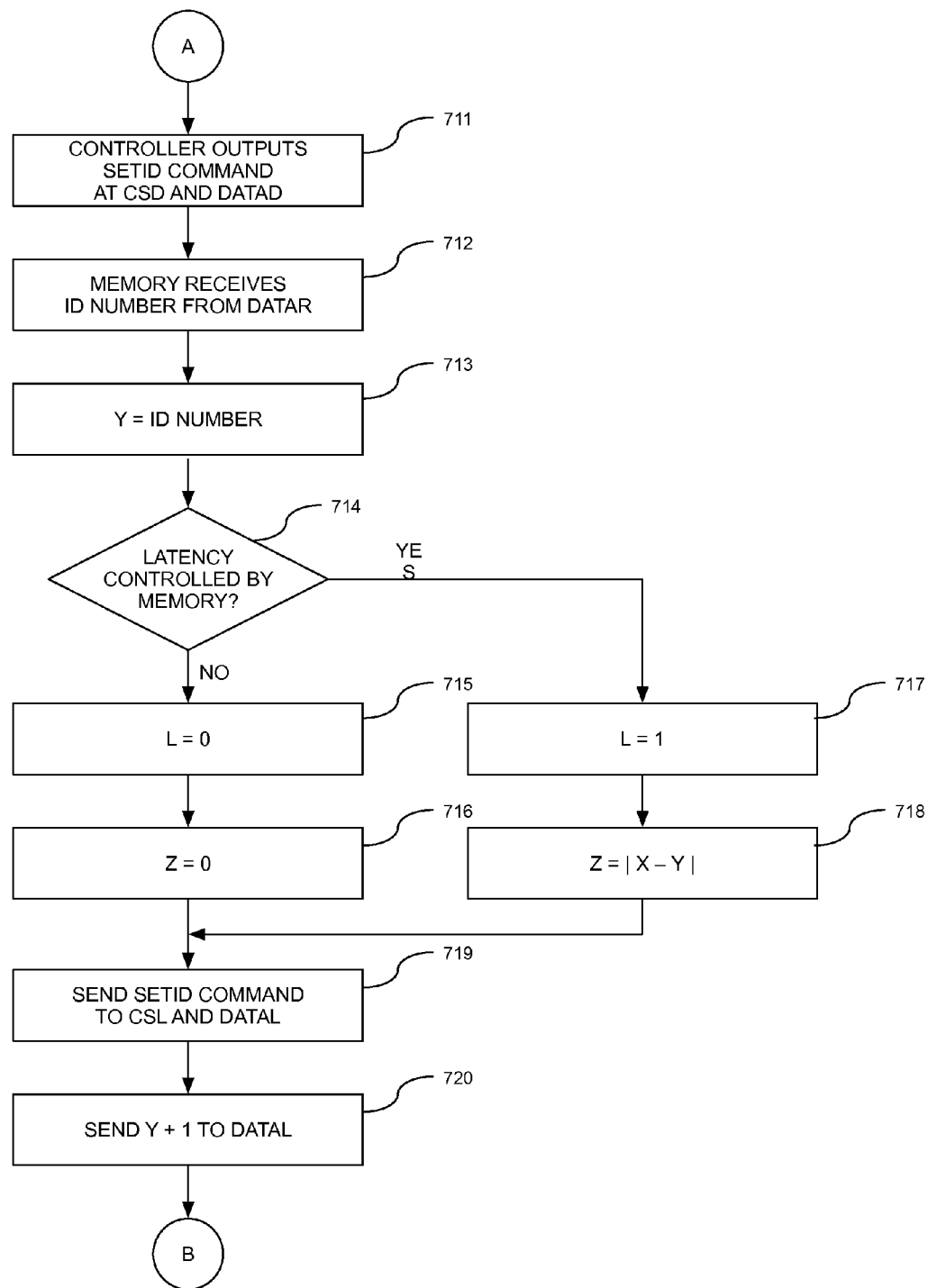

FIGS. 7A and 7B are flowcharts for a SETID command shown in FIGS. 6A and 6B. At step 700, the controller 310 assigns a device ID corresponding to the device in the loop-chain shown in FIG. 6A, that the controller 310 will write to or read from. At step 700, the controller 310 assigns a reverse device ID corresponding to the device in the loop-chain shown in FIG. 6B, that the controller 310 will write to or read from. In one embodiment, if the device ID and the reverse device ID refer to the same device in the loop-chain then a WRITE command will write a half of a word to one port of the device and the other half of the word to the other port of the device, in a split transaction. In another embodiment, if the device ID and reverse device ID refer to different devices, then one device is written to or read from with a full word, and a second device is written to or read from with a different full word. At step 700, the controller 310 assigns a latency variable Z and a latency control flag L. If the latency control flag is enabled, then the aforementioned split transaction will delay half of the word being read so that both halves of the word arrive at the controller 310 in the same clock cycle.

At steps 701, 702 and 703, the controller 310 communicates a SETID command and a device ID to a device as shown in FIG. 6A, for example device 320. Device 320 receives both the SETID command and the device ID at DATAL when the CSL strobe is activated. In one embodiment, CSL is high when active. At steps 711, 712 and 713, the controller 310 communicates a SETID command and a reverse device ID to a device as shown in FIG. 6B, for example device 320. Device 320 receives both the SETID command and the reverse device ID at DATAR when the CSR strobe is activated. In one embodiment, CSR is high when active.

If the latency control flag is enabled (e.g. L=1) then the latency variable Z is assigned the absolute numerical difference between the device ID and the reverse device ID. For example in FIG. 6A if device 320 was the first of six devices in a loop-chain, then the device ID is assigned to one, the reverse device ID is assigned to six, and the latency variable is five. When device 320 is read with a split transaction then half of a word is read from DATAR passing through five devices until it reaches the controller 310. The other half of the word is read from DATAL after a five cycle delay, thereby reaching the controller 310 in the same cycle as the first half of the word. After calculating the latency variable if the latency control flag is enabled, the SETID command is transmitted to the other port of the device, DATAR at step 709 and DATAL at step 719. At step 710, the device ID is incremented by one and transmitted to the next device in a clockwise manner shown in FIG. 6A. Similarly, at step 720, the reverse device ID is incremented by one and transmitted to the next device in a counter-clockwise manner shown in FIG. 6B.

Figure 7C:
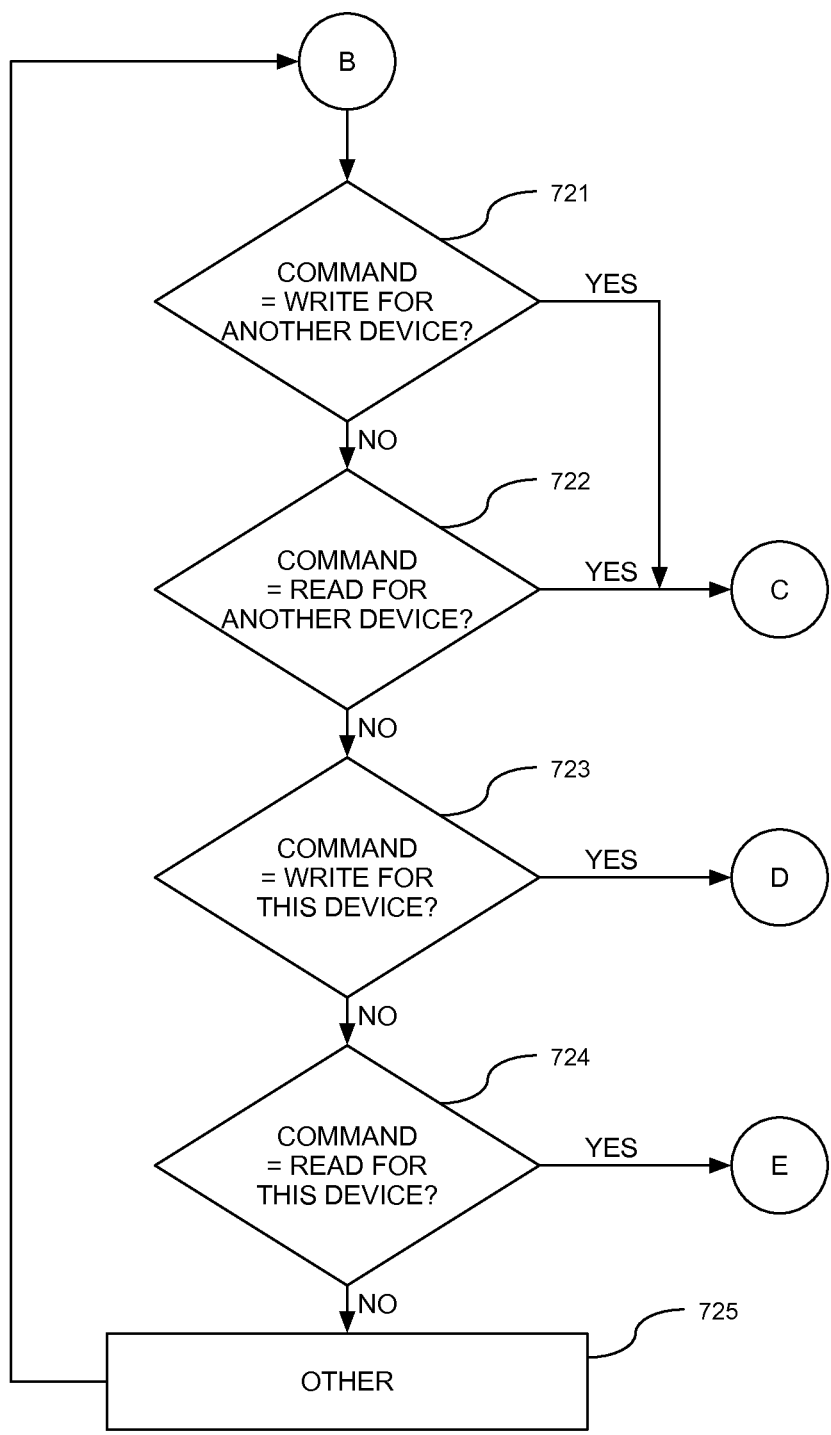
Figure 7D:
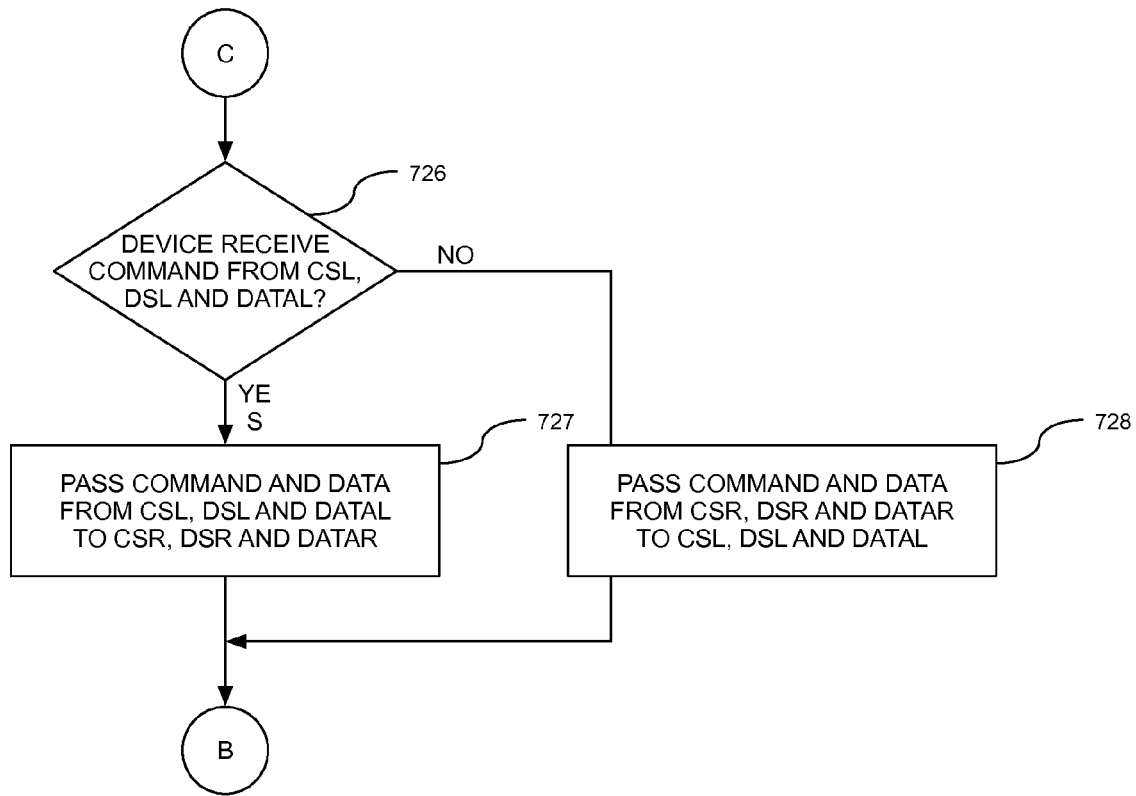
Figure 7E:
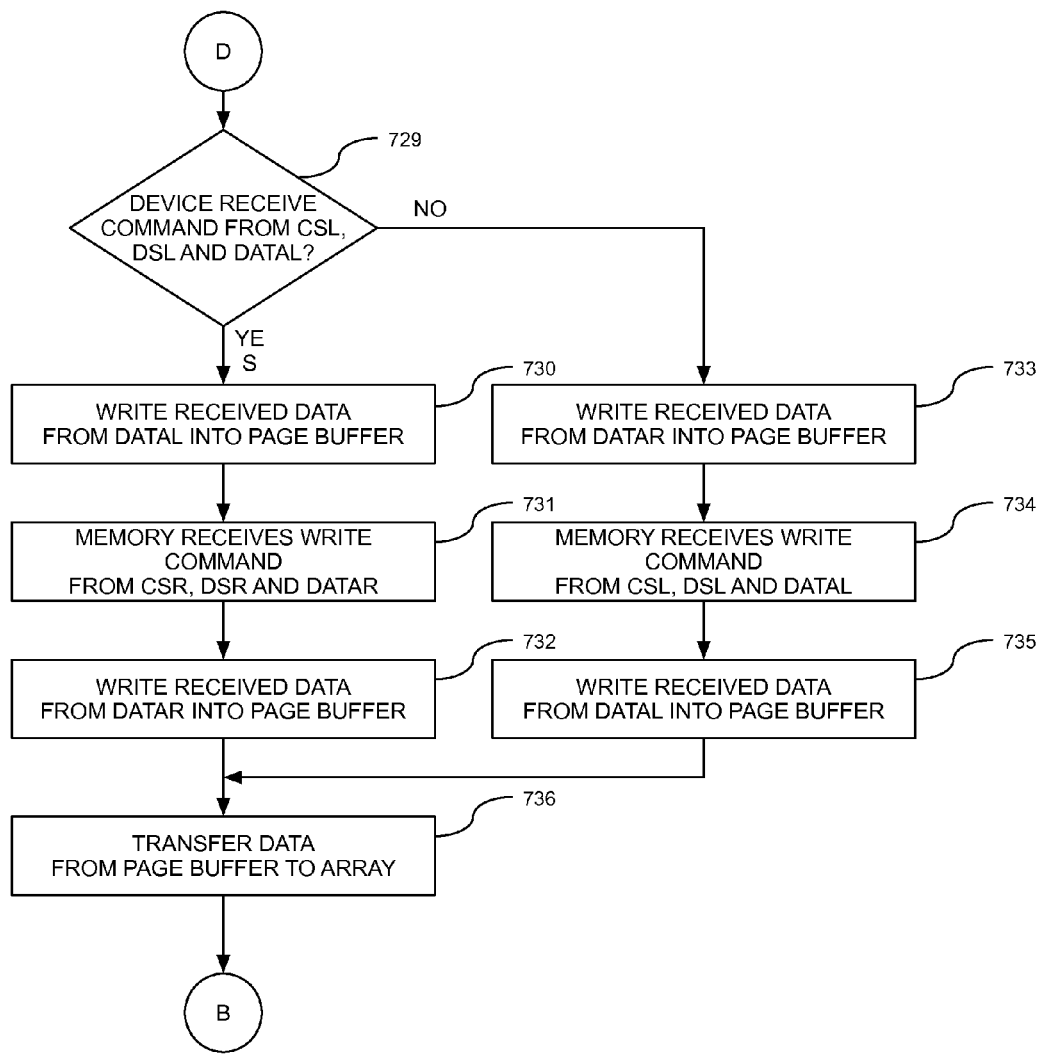

FIGS. 7C, 7D and 7E are flowcharts for a WRITE command. At steps 721 and 722, if the data command ID, for either a WRITE or READ command, does not match the device ID, or similarly a reverse command ID does not match a reverse device ID, then the command is retransmitted to the other port from which is was received as shown in steps 726, 727 and 728.

If the command is a WRITE command at step 723, with a command ID matching the device ID or a reverse command ID matching the reverse device ID, then the WRITE command is processed. In one embodiment, where both the device ID and the reverse command ID match their respective command ID and reverse command ID, the WRITE commands execute a split transaction as shown in FIG. 7E. In FIG. 7E, a write data received into data buffer 410 as shown in FIG. 4 is first transferred into page buffer 460 at step 730. The write data received into data buffer 411 is then transferred into page buffer 461 at step 732. The contents of pager buffer 460 and 461 are then transferred to the memory array 470 at step 736. Conversely if the write data is first received into data buffer 411, then transferred to page buffer 461 at step 733, then the write data received into data buffer 410 is transferred to pager buffer 460 at step 735. The two half words contained in pager buffer 460 and 461 are then transferred to the memory array 470 at step 736. In another embodiment, the page buffers 460 and 461 are a dual ported memory that can received data from data buffer 410 and data buffer 411 in the same clock cycle. In another embodiment, the memory array 470 is a multi-ported memory that can communicate directly with the data buffers 410 and 411.

Figure 7F:
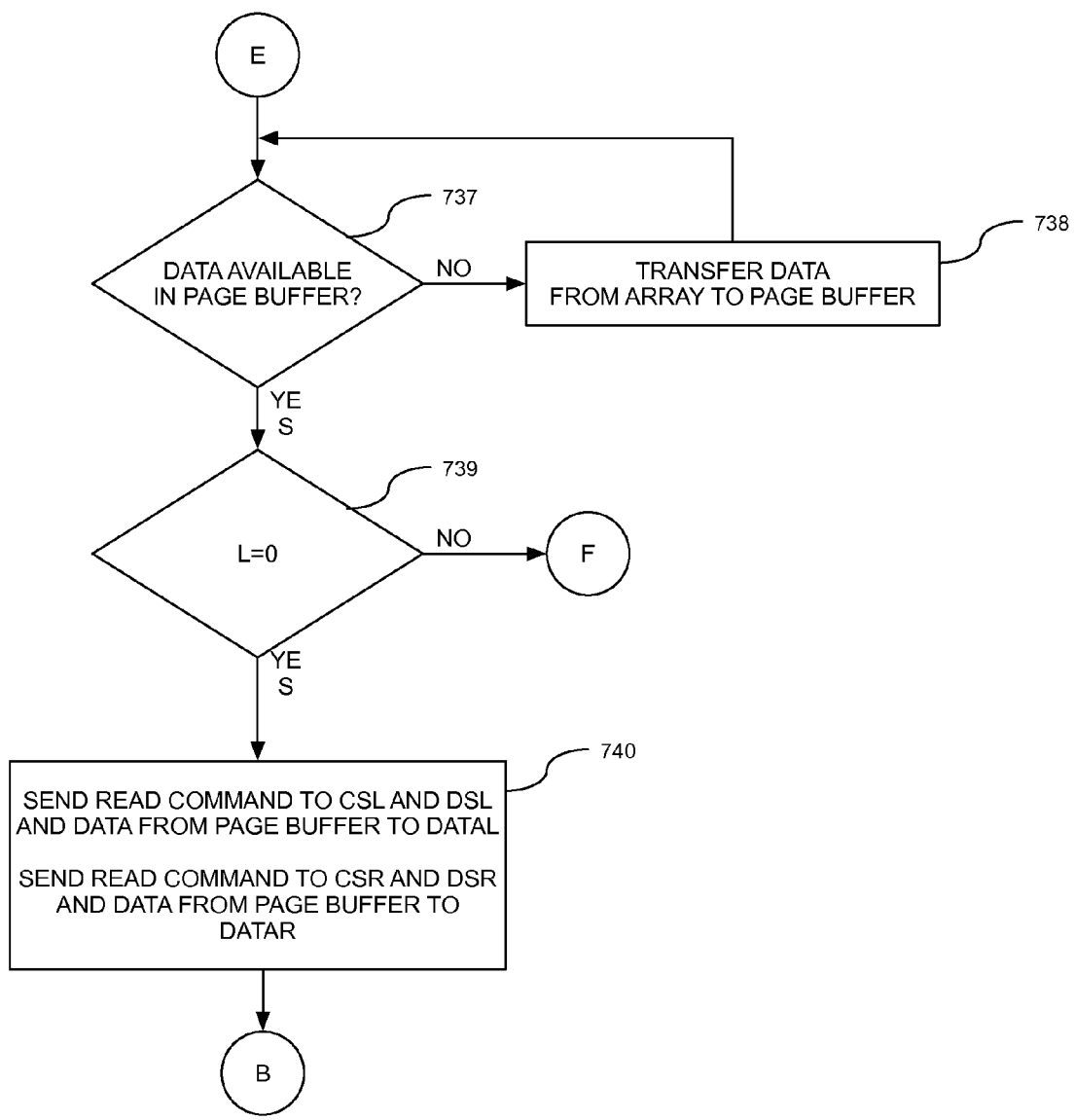
Figure 7G:
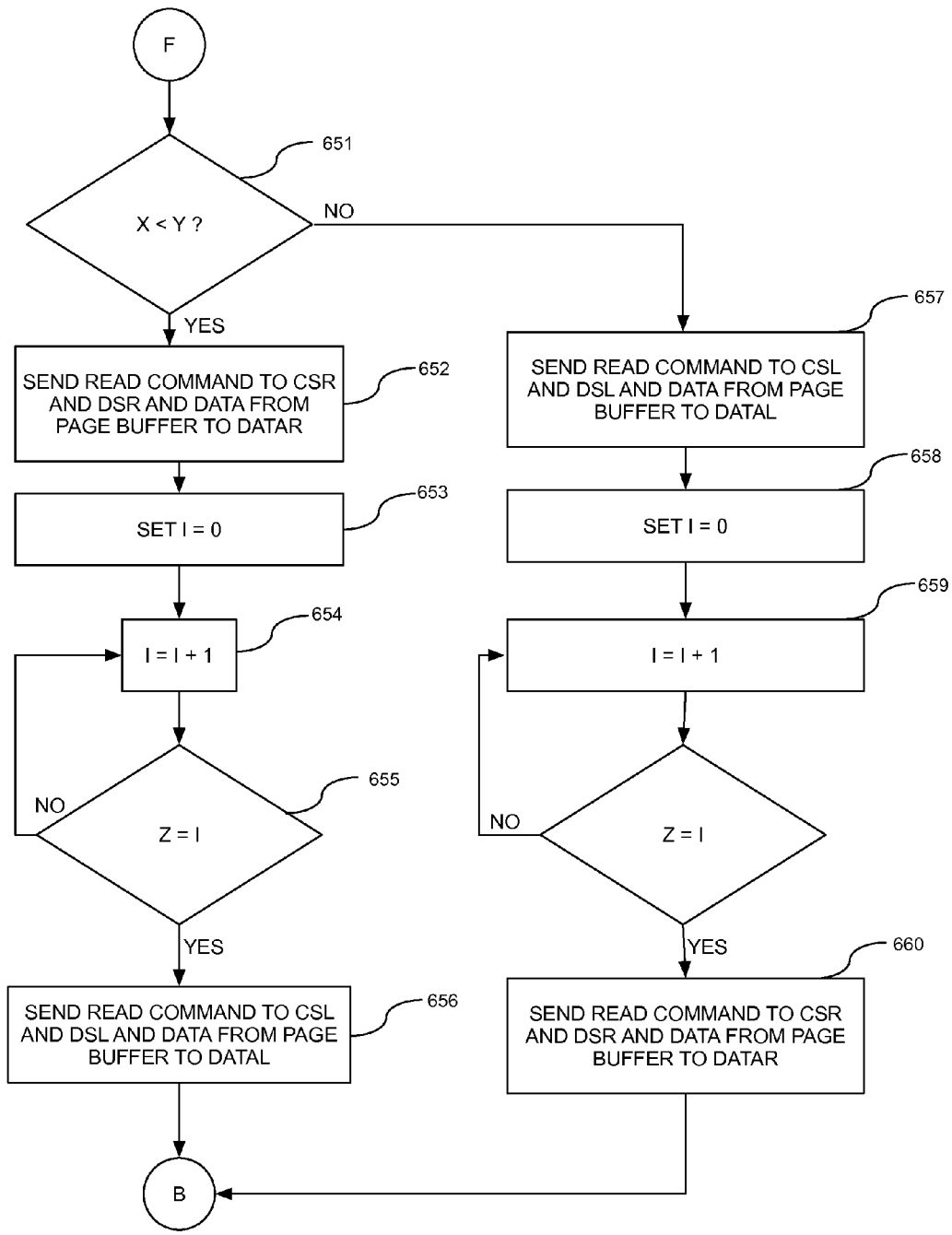

FIGS. 7C, 7D, 7F and 7G are flowcharts for a READ command. If the command is a READ command at step 724, with the command ID matching the device ID or the reverse command ID matching the reverse device ID, then the READ command is processed as shown in FIGS. 7F and 7G. If a command ID matches the device ID or the reverse command ID matches the reverse device ID and the command is neither a READ nor a WRITE command, then an OTHER command is processed. In one embodiment, the OTHER command is firmware configurable and provides test mode access to the memory array 470.

At steps 737 and 738, if the data to be read is not available in the page buffers it is transferred from the memory array 470 to the page buffers 460 and 461. In another embodiment the data to be read is read directly from the memory array 470 with multiple ports. At step 739, if the latency control flag is not enabled, then the data from page buffer 460 is transferred to data buffer 410 to be read of one port of the device, and the data from page buffer 461 is transferred to data buffer 411 to be read out of the other port of the device.

At step 739, if the latency control flag is enabled, and the device ID (X) is less than the reverse device ID (Y), as shown in FIG. 6E, then the data is transferred from the page buffer 461 to the data buffer 411 to be read out of the device 320, and the data from the page buffer 460 is transferred to the data buffer 410 to be read out after a delay equal to the absolute numerical difference between the device ID and the reverse device ID. This ensures that the data from both page buffers 460 and 461 arrive at the controller 310 in the same clock cycle.

At step 739, if the latency control flag is enabled, and the device ID (X) is not less than the reverse device ID (Y), as shown in FIG. 6F, then the data is transferred from the page buffer 460 to the data buffer 410 to be read out of the device 32$n$, and the data from the page buffer 461 is transferred to the data buffer 411 to be read out after a delay equal to the absolute numerical difference between the device ID and the reverse device ID. This ensures that the data from both page buffers 460 and 461 arrive at the controller 310 in the same clock cycle.

Figure 8A:
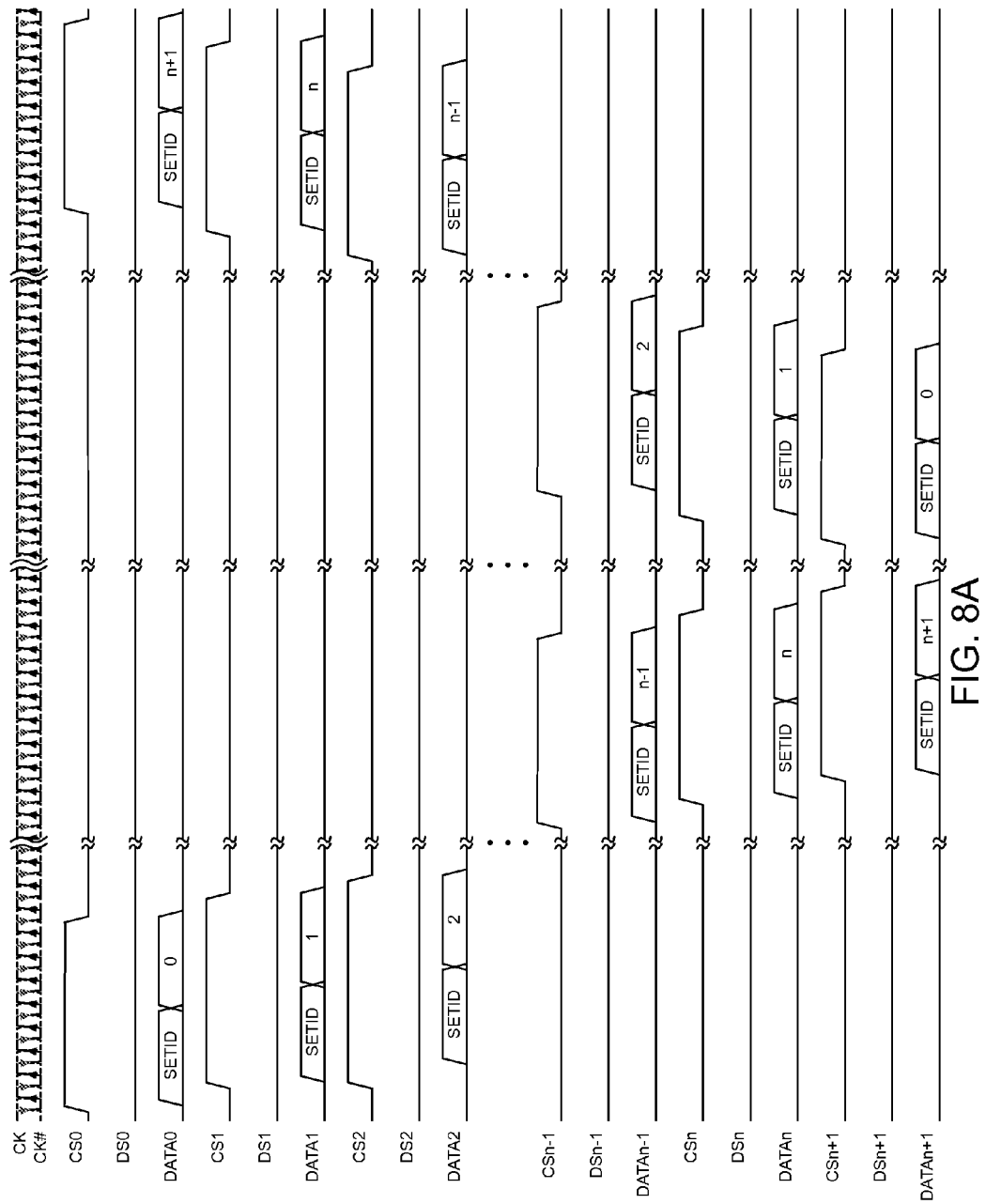
FIGS. 8A to 8D are timing diagrams of the method performed by a memory device, according to an embodiment of the invention.

FIG. 8A is a timing diagram for the SETID command as described in the flowcharts of FIGS. 7A and 7B. First, the memory controller 310 sends the SETID command at CSU, DSU and DATAU with an ID number that may be 0. The memory device 320 in FIG. 3 registers the ID number as 0, and passes the SETID command with the ID number that may be incremented by 1 to the next memory device 321. The SETID command is passed sequentially from each memory device to the next memory device in the loop-chain until it reaches the memory controller 310 resulting in the memory devices 320 through 32$n$ having a register ID numbered from 0 to n respectively. Then, the memory controller 310 sends the SETID command at CSD, DSD and DATAD with a reverse ID number that may be 0. The memory device 32$n$ registers the reverse ID number, 0, and passes the SETID command with reverse ID number that may be incremented by 1 to the next memory device 32$n$−1. The SETID command is passed sequentially from each memory device to the next memory device in the loop-chain until it reaches the memory controller 310 resulting in the memory devices 32$n$ through 320 having a register reverse ID number from 0 to n respectively. After two SETID commands issue, each of the memory devices have an ID number and a reverse ID number, which indicate the number of devices and the position of each device in the loop-chain. Accordingly, each device can transmit a half word from one port delayed relative to the transmission of the other half word at the second port such that both half words arrive at the controller 310 in the same clock cycle. It is envisioned that when more than two ports exist on each device, for example six ports in a three-dimensional array, the various device ports can be delayed by different amounts such that data read from each port arrives at the controller in the same cycle.

Figure 8B:
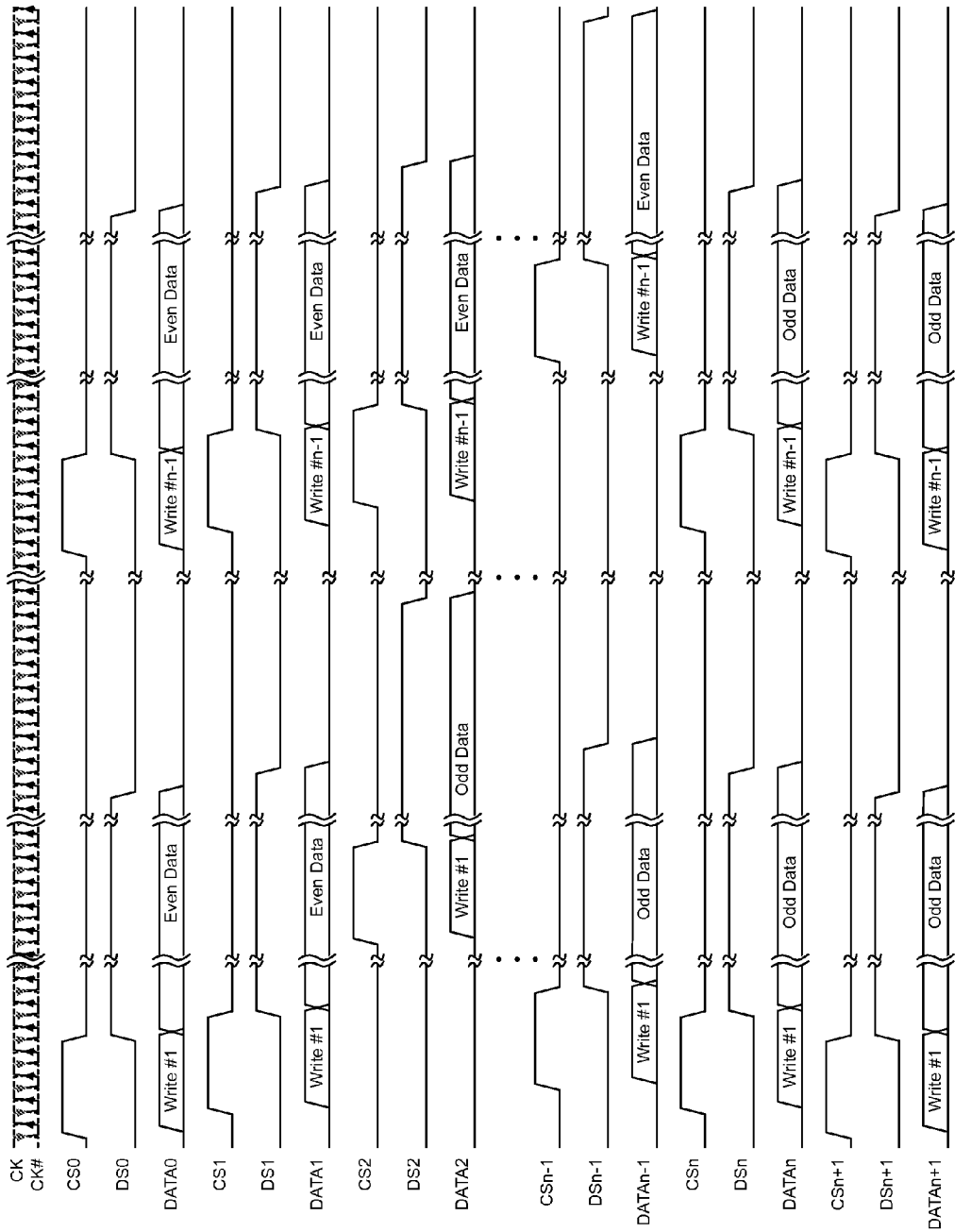

FIG. 8B is a timing diagram for the WRITE command as described in the flowcharts of FIGS. 7C, 7D and 7E. The memory controller sends a WRITE command at CSU, DSU and DATAU with a command ID number that may be between 0 and n followed by a half word to be written to a device. The memory controller also sends a WRITE command at CSD, DSD and DATAD with a reverse command ID number corresponding to the same device followed by the other half of the data to be written. The WRITE command is sent through the loop-chain until the command ID number matches the device ID number. The WRITE command is also sent through the loop-chain in the opposing direction until the reverse command ID number matches the reverse device ID number. By not propagating the WRITE command further than is necessary, overall system power is reduced. In another embodiment, the WRITE command is allowed to propagate through the entire loop-chain, which reduces the logic complexity of each device. After a successful match of a command ID number to a device ID number, or a reverse command ID number to a reverse device ID number, the respective command ID numbers read into the device by activating the command strobe, a one or more data is read into the device by activating the data strobe.

Figure 8C:
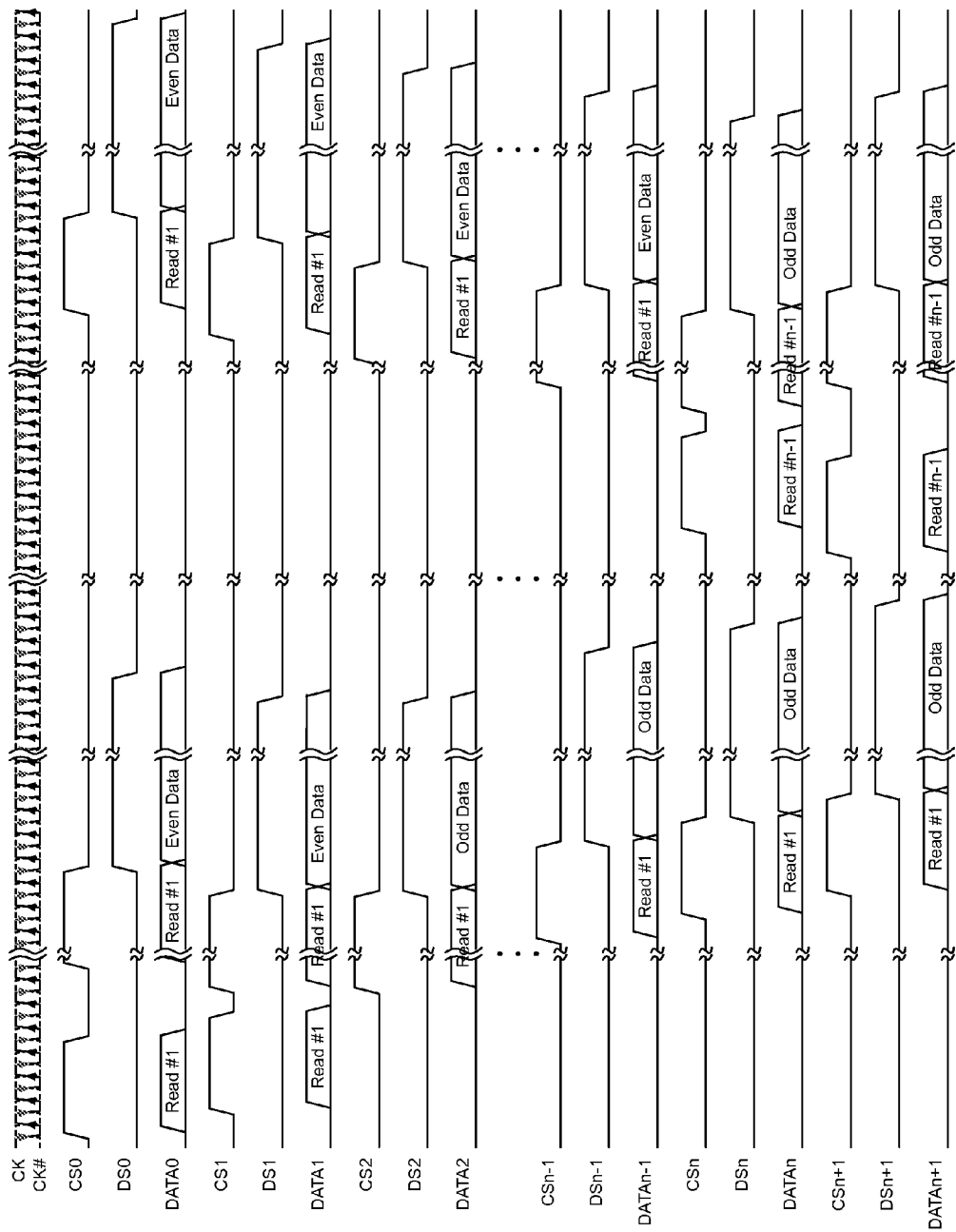
Figure 8D:
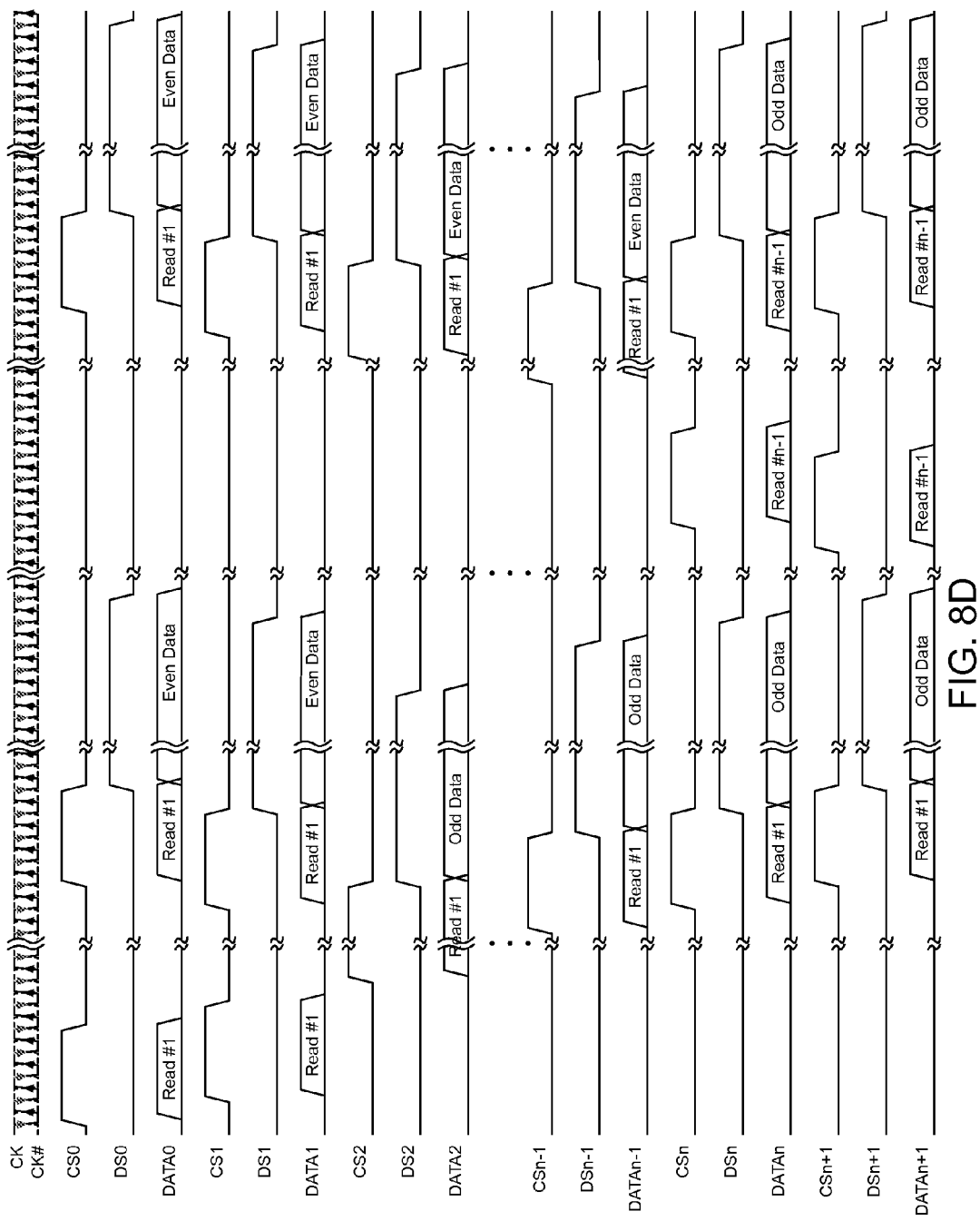

FIGS. 8C and 8D show timing diagrams for a READ command as described in the flowcharts of FIGS. 7C, 7D, 7F and 7G. In one embodiment, to minimize latency while reading out data from memory devices close to the memory controller's CSU, DSU and DATAU, including devices with a registered ID number from 0 to [(n+1)/2]−1, the memory controller sends a READ command at CSU, DSU, and DATAU with an ID number that may be from 0 to [(n+1)/2]−1. Similarly, to read out data from memory devices close to the memory controller's CSD, DSD and DATAD, including devices with a registered ID number from (n+1)/2 to n, the memory controller sends a READ command at CSD, DSD and DATAD with an ID number that may be from (n+1)/2 to n.

In another embodiment, to optimize read bandwidth, a READ command with a command ID number is sent at CSU, DSU and DATAU and passed from memory device to memory device until it reaches the memory device where the command ID number and the device ID number match. A READ command with a reverse command ID number is also issued at CSD, DSD and DATAD a passed from memory device to memory device until it reaches the memory device where the reverse command ID number and the reverse device ID number match. The device then reads out half of the data word from page buffer 460 to DATAL as shown in FIG. 4 and the other half of the data word from page buffer 461 to DATAR.

Figure 9A:
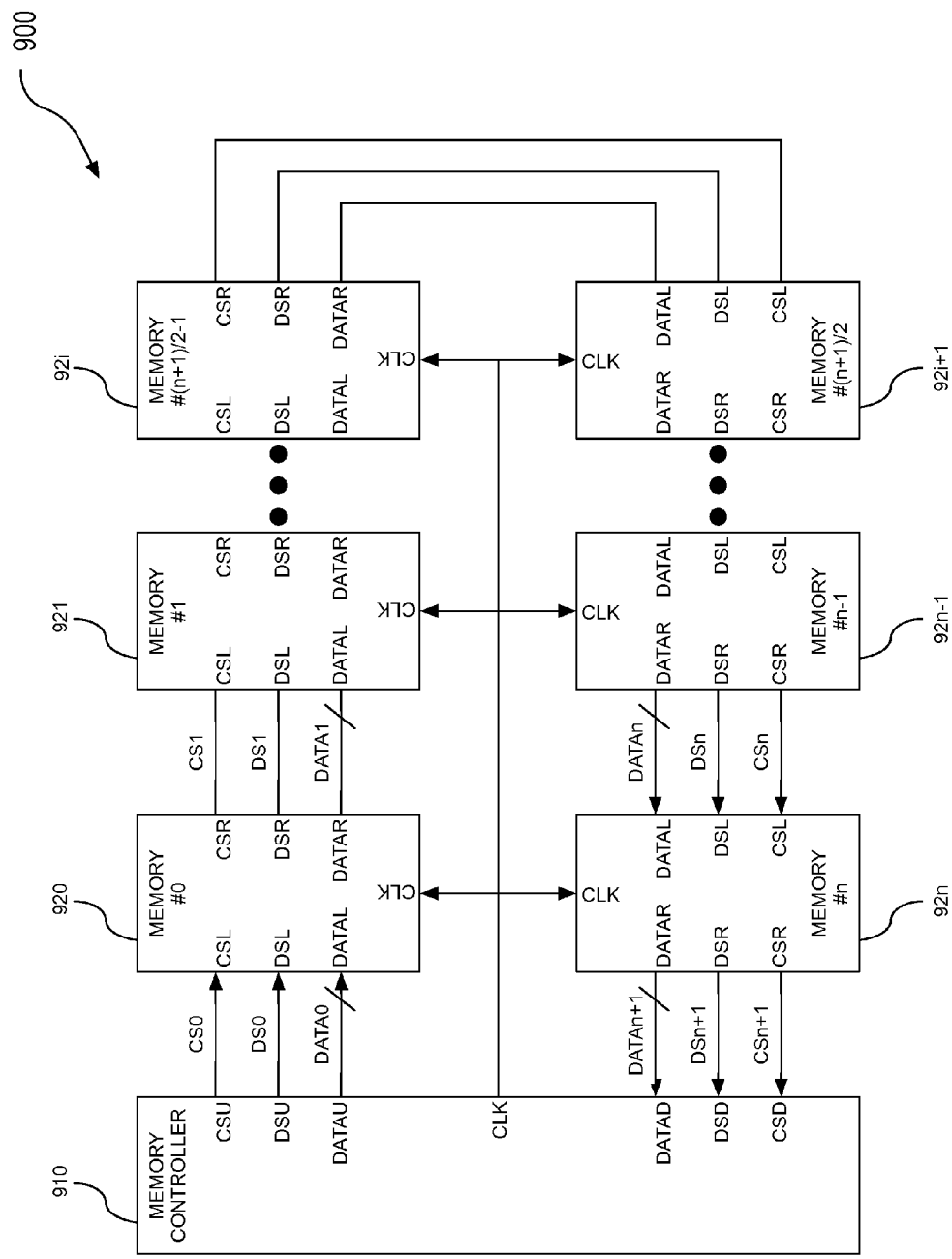
FIGS. 9A and 9B are schematic diagrams showing the directions of signals for simultaneous READ and WRITE operations, according to an embodiment of the invention.
Figure 9B:
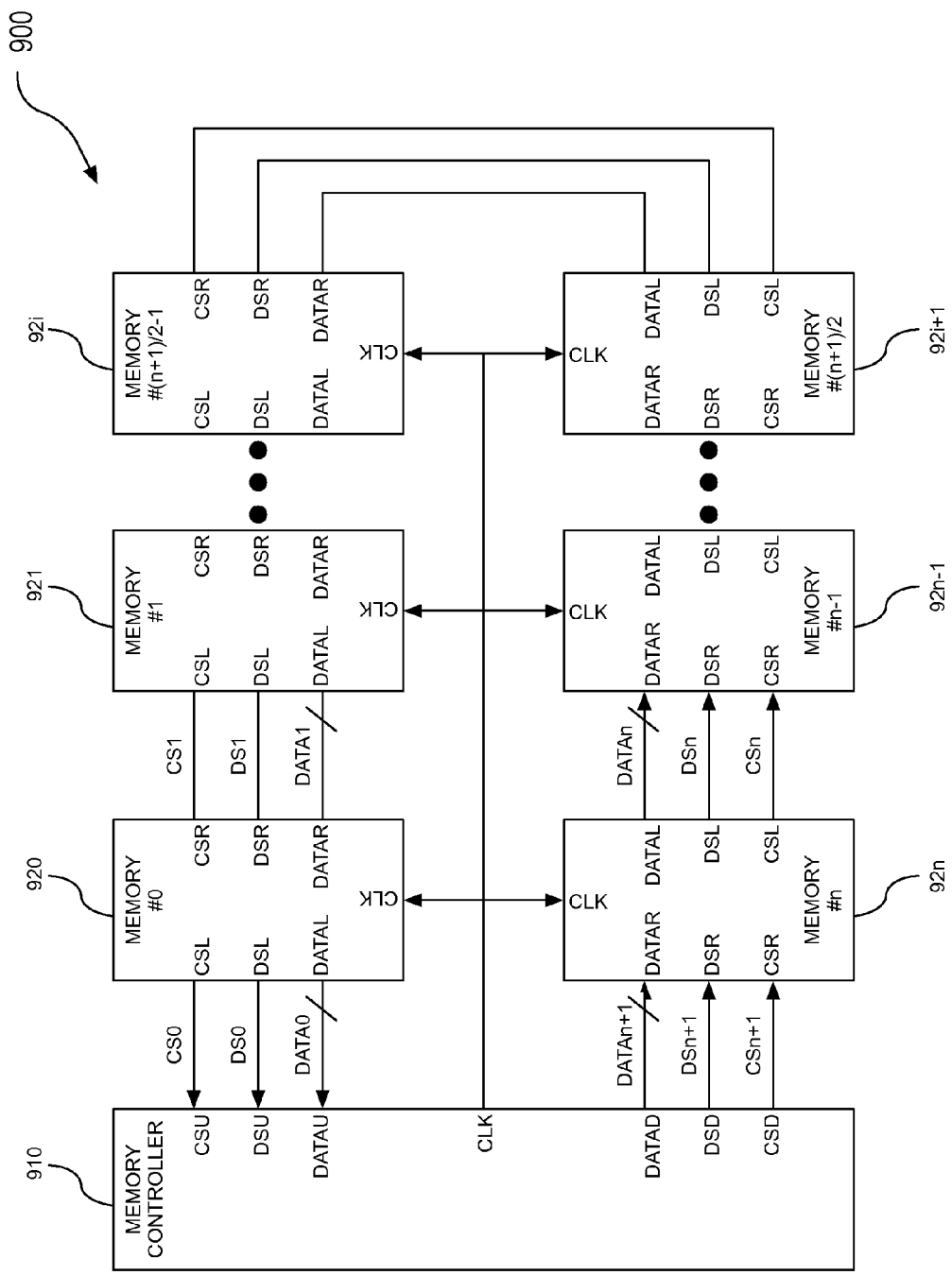

FIGS. 9A and 9B show the directions of signals for a concurrent READ and WRITE. In FIG. 9A, the memory controller 910 sends a WRITE command at CSU, DSU and DATAU with a device ID number i that may be between 0 and n and a READ command at CSD, DSD and DATAD with a reverse device ID number that may be between i and n. For example, the memory controller 910 can write to device 921 while reading from device 92$n$−1. In FIG. 9B, the memory controller 910 sends a READ command at CSU, DSU and DATAU with device ID number i that may be between 0 and n and a WRITE command at CSD, DSD and DATAD with device ID number that may be between i and n. The memory controller 910 simultaneously writes data into and reads data from one single memory device or two different memory devices. For example, the memory controller 910 can read from device 921 while writing to device 92$n$−1, or the memory controller 910 could read and write from device 921.

Figure 9C:
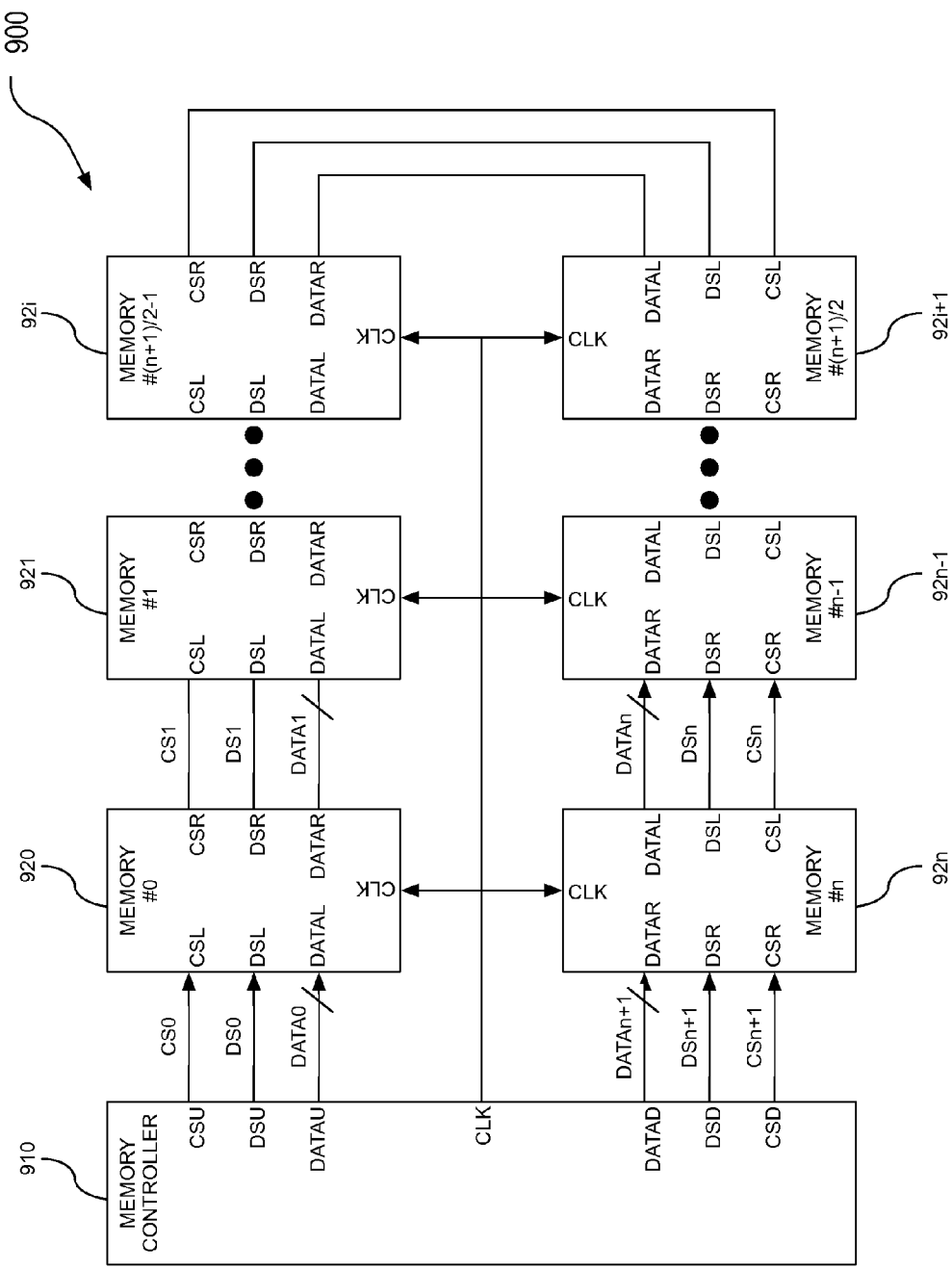
FIG. 9C is a schematic diagram showing the directions of signals for simultaneous WRITE operations, according to an embodiment of the invention.

FIG. 9C shows the directions of signals for two concurrent WRITE commands. The memory controller 910 sends a WRITE command at CSU, DSU and DATAU with a device ID number, i, that may be between 0 and n−1 and a WRITE command at CSD, DSD and DATAD with a reverse device ID number that may be between i+1 and n. The memory controller 910 simultaneously writes data into two different memory devices.

Figure 9D:
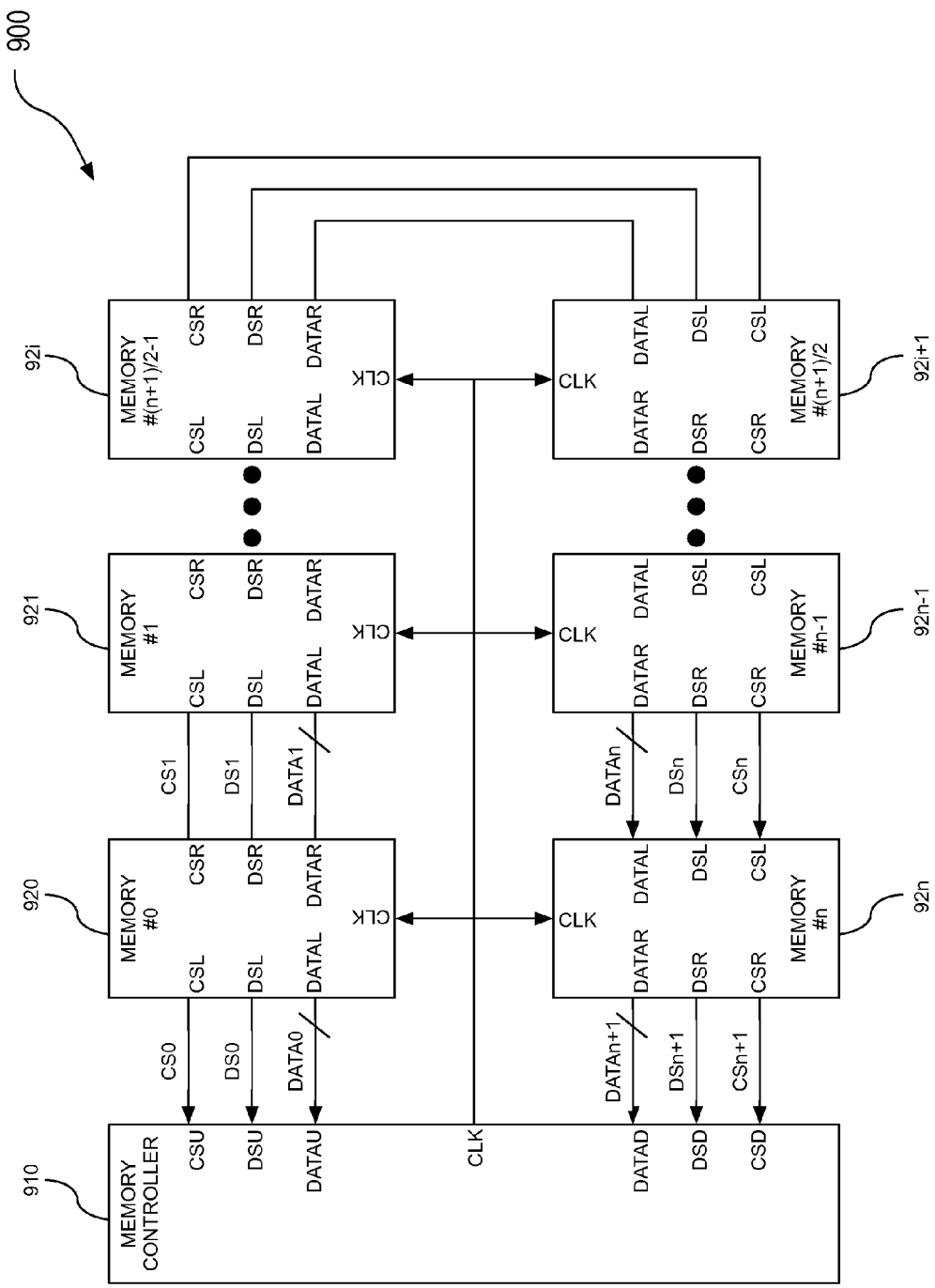
FIG. 9D is a schematic diagram showing the directions of signals for simultaneous READ operations, according to an embodiment of the invention.

FIG. 9D shows the directions of signals for two concurrent READ commands. The memory controller 910 sends a READ command at CSU, DSU and DATAU with a device ID number, i, that may be between 0 and n−1 and a READ command at CSD, DSD and DATAD with a reverse device ID number that may be between i+1 and n. The memory controller 910 simultaneously reads data from two different memory devices.

Figure 9E:
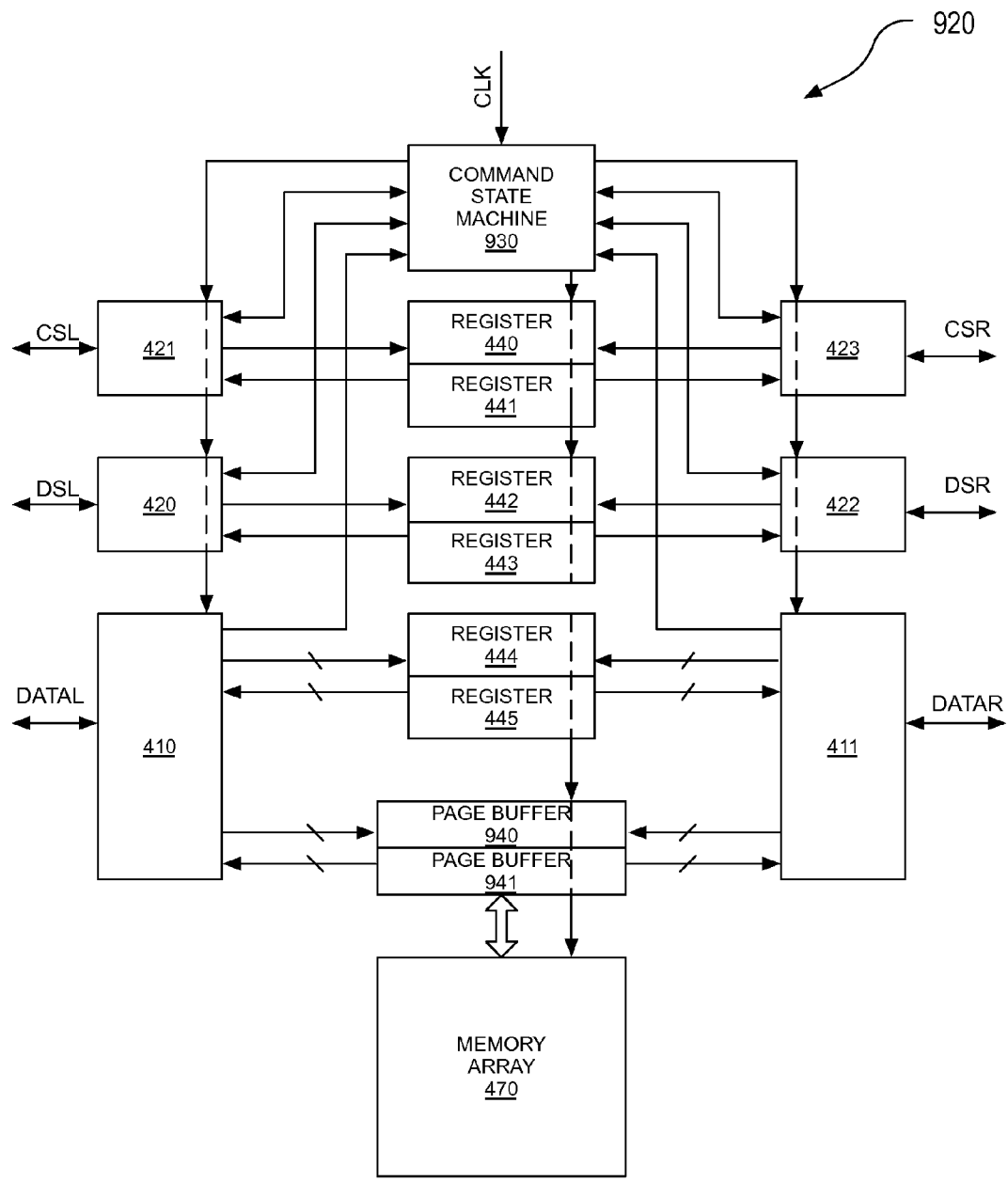
FIG. 9E is a block diagram of a memory device shown in the embodiments shown in FIGS. 9A to 9D.

FIG. 9E is an embodiment of a block diagram of a memory device 920 for simultaneous access. In another embodiment, the page buffers 940 and 941 are a single dual ported memory.

Figure 10A:
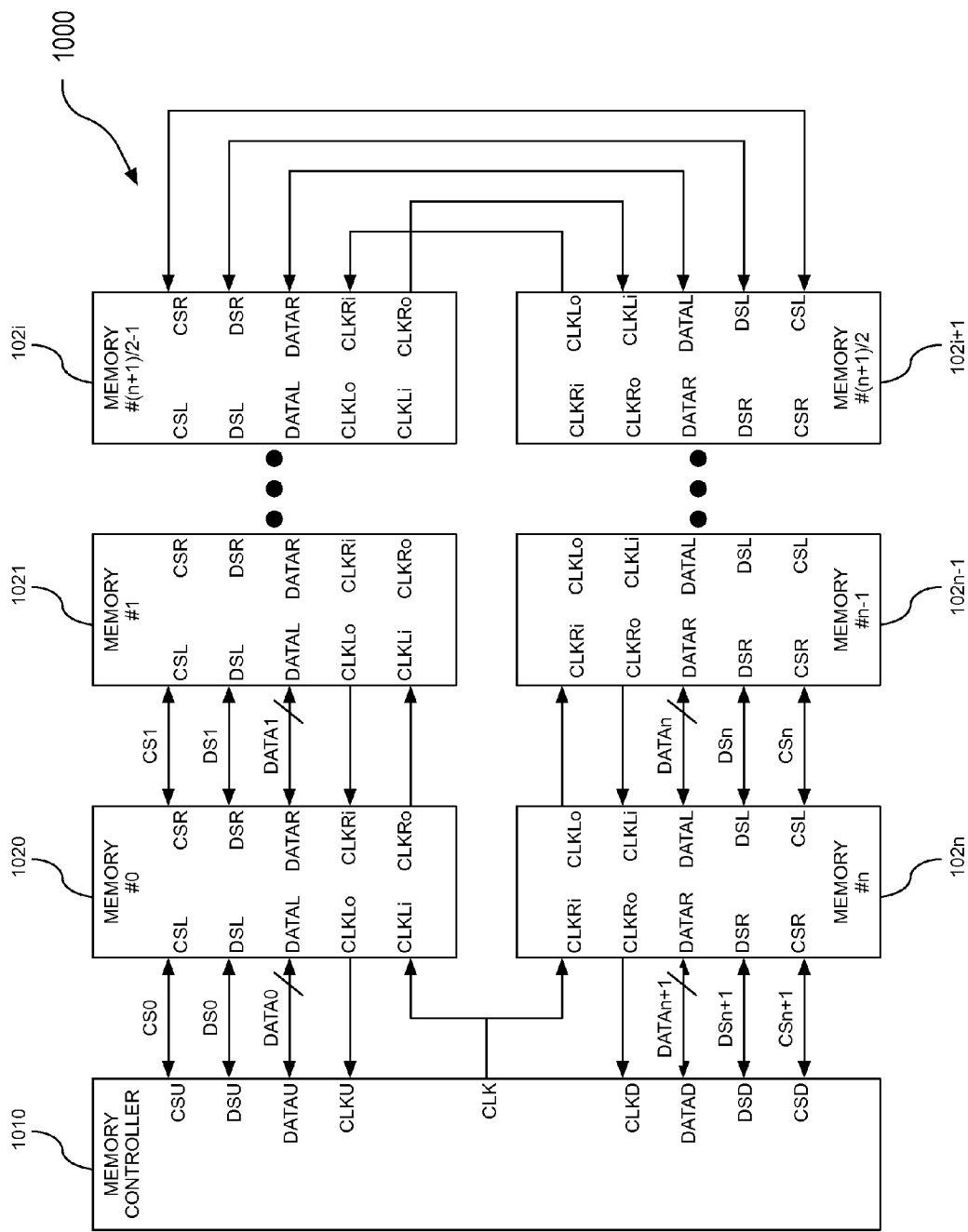
FIG. 10A is a schematic diagram showing the directions of signals, according to an embodiment of the invention.
Figure 10B:
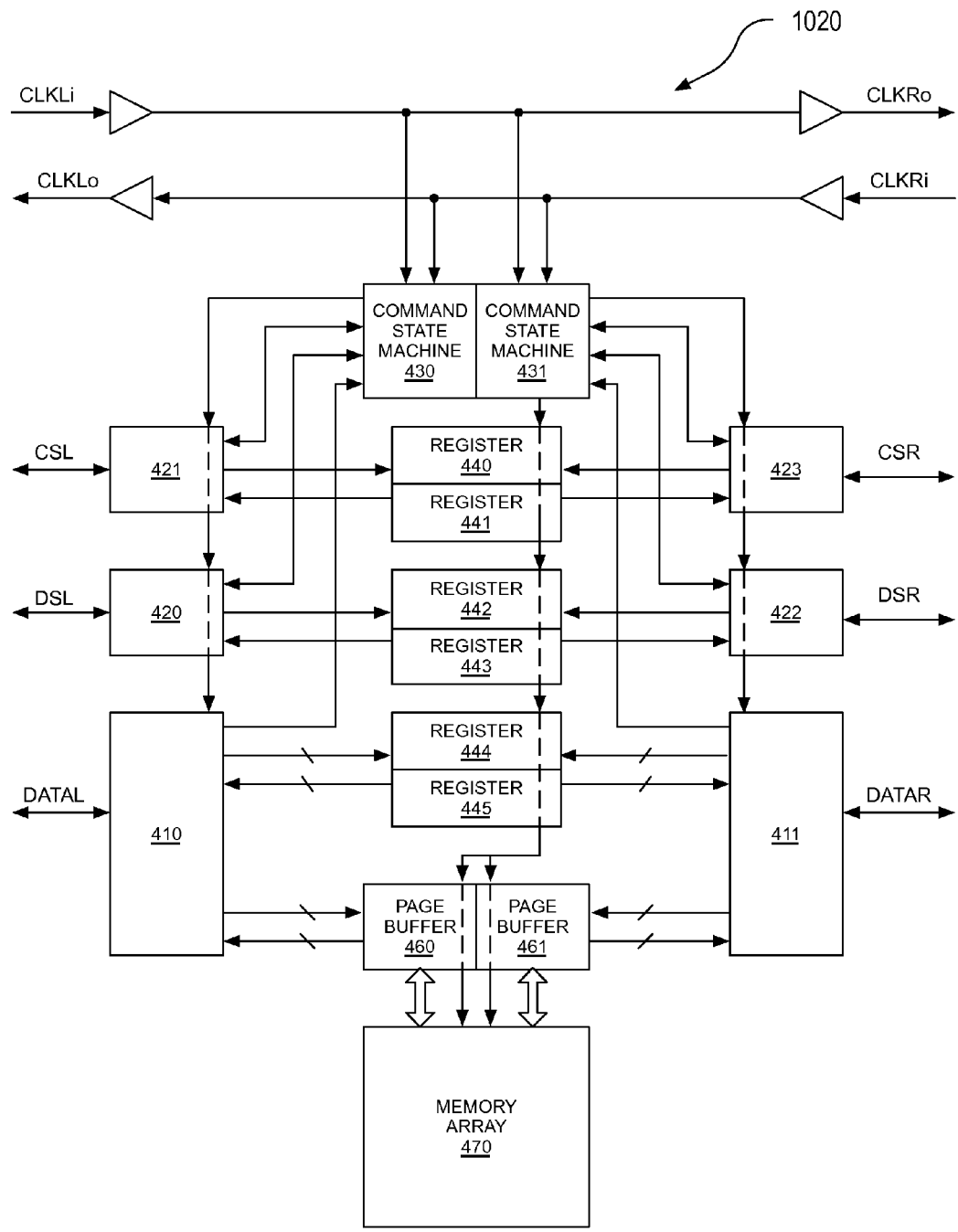
FIG. 10B is a block diagram of a memory device shown in the embodiment in FIG. 10A.

FIG. 10A shows the directions of signals for a loop-back system with a source synchronous clock. FIG. 10B shows a block diagram of a memory device 1020 for source synchronous clock shown in FIG. 10A. In FIG. 10A the memory controller 1010 sends a clock at CLK. Memory devices 1020 to 102$n$ pass a clock (CLK) from CLKLi to CLKRo and from CLKRi to CLKLo. The memory controller 1010 sends commands synchronized with the clock thereby minimizing clock skew and affording high clock rates.

Memory devices 1020 to 102$n$ receive commands at the command strobe buffer 421, data strobe buffer 420 and data buffer 410 synchronized with CLKLi and if required then sends commands at command strobe buffer 423, data strobe buffer 422 and data buffer 411 synchronized with CLKRo.

While the invention has been shown and described with reference to specific preferred embodiments, it should be understood by those skilled in the art that various changes in form and detail may be made therein without departing from the spirit and scope of the invention as defined by the following claims.

The invention claimed is:

1. A method for operating a plurality of devices, one of the devices being configured to write a word, the one device having first and second ports, the method comprising:
storing at the one device a first identification (ID) number received at the first port of the one device and a second ID number received at the second port of the one device;
receiving, by the one device, a data command through at least one of the first and second ports, the data command having a command ID number; and
executing, by the one device, the data command when at least one of the command ID number is equal to the stored first ID number when the data command is received through the first port, and the command ID number is equal to the stored second ID number when the data command is received through the second port, the executing the data command including writing a first half of the word through the first port of the one device and a second half of the word through the second port of the one device;
wherein the executing the data command further includes delaying one of the first half of the word and the second half of the word by a number of clock cycles equal to the absolute numerical difference between the stored first and second ID numbers.

2. The method of claim 1 further comprising:
transmitting the data command without execution from the one device through the second port, when the data command is received through a the first port and the command ID of the received data command is not the same as the stored first ID number, and transmitting the data command without execution from the one device through the first port when the data command is received through at the second port and the command ID of the received data command is not the same as the stored second ID number.

3. A method for operating a plurality of devices, one of the devices being configured to read a word the one device having first and second ports, the method comprising:
storing at the one device a first identification (ID) number received at a first port of the one device and a second ID number received at a second port of the one device;
receiving, by the one device, a data command through at least one of the first and second ports, the data command having a command ID number; and
executing, by the one device the data command when at least one of the command ID number is equal to the stored first ID number when the data command is received through the first port, and the command ID number is equal to the stored second ID number when the data command is received through the second port,
the executing the data command including reading a first half of the word through the first port of the one device and a second half of the word through, the second port of the one device;
wherein the executing the data command further includes delaying one of the first half of the word and the second half of the word by a number of clock cycles equal to the absolute numerical difference between the stored first and second ID numbers.

4. The method of claim 3 further comprising;
transmitting the data command without execution from the one device through the second port, when the data command is received at the first port and the command ID of the received data command is not the same as the stored first ID number, and transmitting the data command without execution from the one device through the first port when the data command is received at the second port and the command ID of the received data command is not the same as the stored second ID number.

* * * * *